(12) United States Patent
Wang et al.

(10) Patent No.: US 8,680,736 B2
(45) Date of Patent: Mar. 25, 2014

(54) ARMATURE CORE, MOTOR USING SAME, AND AXIAL GAP ELECTRICAL ROTATING MACHINE USING SAME

(75) Inventors: Zhuonan Wang, Hitachi (JP); Yuji Enomoto, Hitachi (JP); Shigeki Morinaga, Hachioji (JP); Ryoso Masaki, Narashino (JP); Shigeho Tanigawa, Okegawa (JP); Hiromitsu Itabashi, Tottori (JP); Motoya Ito, Hitachinaka (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 543 days.

(21) Appl. No.: 12/615,382

(22) Filed: Nov. 10, 2009

(65) Prior Publication Data

US 2010/0148611 A1   Jun. 17, 2010

(30) Foreign Application Priority Data

Nov. 10, 2008  (JP) .................................. 2008-287268
Mar. 31, 2009  (JP) .................................. 2009-088575

(51) Int. Cl.
*H02K 1/18* (2006.01)
*H02K 1/12* (2006.01)

(52) U.S. Cl.
USPC ............................ 310/216.045; 310/216.046

(58) Field of Classification Search
USPC ........... 310/216.045, 268, 68 D, 64, 216.111, 310/216.046
IPC ................................................ H02K 1/12,1/18
See application file for complete search history.

(56) References Cited

U.S. PATENT DOCUMENTS 4,255,684 A  *  3/1981  Mischler et al. ....... 310/216.031
(Continued)

FOREIGN PATENT DOCUMENTS

CN  101286676  10/2008
JP  05-114525  5/1993
(Continued)

OTHER PUBLICATIONS

Official Action issued in Japanese Patent Application No. 2008-287268 on Aug. 21, 2012.

*Primary Examiner* — Burton Mullins
*Assistant Examiner* — Michael Andrews
(74) *Attorney, Agent, or Firm* — Antonelli, Terry, Stout & Kraus, LLP.

(57) ABSTRACT

An armature core includes a core portion formed of a lamination of plural non-crystalline metallic foil bands, wherein the armature core is provided with at least two cut surfaces with respect to the lamination layers. Amorphous metal is used as the iron base of the non-crystalline metallic foil bands. The cut surfaces are perpendicular to the lamination layers of the non-crystalline foil bands. Still further, the stator includes a stator core holding member in a disc form, the stator having a plurality of holes or recessions that are substantially in the same shape as a cross-sectional shape of the stator cores and wherein the stator cores are inserted in the holes or recessions of the stator core holding member and held by fixing in vicinities of respective central portions thereof, the central portions being with respect to the axial direction thereof.

12 Claims, 24 Drawing Sheets

(56) References Cited

U.S. PATENT DOCUMENTS

| | | | |
|---|---|---|---|
| 4,568,862 A * | 2/1986 | Tassinario | 318/400.37 |
| 5,671,524 A * | 9/1997 | Damsky et al. | 29/596 |
| 5,801,473 A * | 9/1998 | Helwig | 310/216.061 |
| 6,259,233 B1 * | 7/2001 | Caamano | 310/216.113 |
| 6,407,466 B2 | 6/2002 | Caamano | |
| 6,445,105 B1 * | 9/2002 | Kliman et al. | 310/268 |
| 6,663,943 B2 * | 12/2003 | Kadota | 310/348 |
| 6,803,694 B2 * | 10/2004 | Decristofaro et al. | 310/216.106 |
| 2004/0046470 A1 | 3/2004 | Decristofaro et al. | |
| 2006/0082241 A1 * | 4/2006 | Enomoto et al. | 310/216 |
| 2010/0148611 A1 * | 6/2010 | Wang et al. | 310/156.37 |

FOREIGN PATENT DOCUMENTS

| | | |
|---|---|---|
| JP | 6-253522 | 9/1994 |
| JP | 2002-247813 | 8/2002 |
| JP | 2004-007917 | 1/2004 |
| JP | 2004-248440 | 9/2004 |
| JP | 2005-287212 | 10/2005 |
| JP | 2006-512035 | 4/2006 |
| JP | 2006-304474 | 11/2006 |
| JP | 2007-274850 | 10/2007 |
| JP | 2007-311652 | 11/2007 |
| JP | 2008-061357 | 3/2008 |
| JP | 2008-245504 | 10/2008 |
| WO | WO 2008/117631 | 10/2008 |

* cited by examiner

422A STATOR CORE
422a
AXIAL DIRECTION

422B STATOR CORE
AXIAL DIRECTION

422C STATOR CORE
AXIAL DIRECTION

422D STATOR CORE
AXIAL DIRECTION

ARMATURE CORE, MOTOR USING SAME, AND AXIAL GAP ELECTRICAL ROTATING MACHINE USING SAME

CROSS REFERENCES TO RELATED APPLICATIONS

This application claims the foreign priority benefit under Title 35, United States Code, §119(a)-(d) of Japanese Patent Application No. 2008-287268, filed on Nov. 10, 2008 in the Japan Patent Office, and Japanese Patent Application No. 2009-088575, filed on Mar. 31, 2009 in Japan Patent Office, the disclosure of which is herein incorporated by reference in its entirety.

BACKGROUND OF THE INVENTION

1. Technical Field

The present invention relates to an armature core, motor using the armature core, and axial gap electrical rotating machine (axial gap motor) having gaps in the axial direction.

2. Description of the Related Art

In recent years, electrical rotating machines with high efficiency and low cost are in demand in view of fuel shortage, environmental contamination, and economy. Amorphous metal is considered to be used for such electrical rotational machines. Being materials excellent in magnetic and mechanical properties including low loss, high magnetic permeability, high strength and rust resistance, amorphous metals are expected for motor cores in application to high efficiency and low cost of a motor.

A commonly used amorphous metal is in a thin and continuous ribbon form having a constant width. With regard to manufacturing methods of a core from an amorphous metal in a ribbon form, related arts can be roughly categorized into three methods. A first method uses a lamination of wound ring forms of the amorphous metal as a core. For example, in Patent Document 1, an example is described where a magnetic body made by winding a continuous amorphous metallic ribbon, cutting it, and then forming is used as a core. Herein, because the wound core is used as it is, a loop circuit is formed with respect to current flowing, which causes a large eddy current loss.

Further, there is nothing that protects the outer side of a core, which makes it difficult to arrange winding wires.

Still further, as a member for insertion to be applied between cores for fixing the cores is necessary, there is a problem of a complicated manufacturing process.

As a second method, a part cut from a body formed by winding amorphous metal is used as a core. For example, in Patent Document 2, a core made by winding an amorphous thin body is held at the outer circumference thereof by a shape maintaining material, such as a silicon steel plate, and attached to a forming jig for forming. In this state, heat treatment and annealing treatment are performed. Thereafter, the silicon steel plate is removed, and then, cut and after cutting, an adhesive agent is coated on the cut surface. By this method, because not all of the winding core can be cut, there is a problem of a low utilization ratio, and it is also highly possible that rust is caused through cutting. Further, there is a problem that the shape and dimensions of a core cannot be easily designed.

As a third method, a core is manufactured by coating an adhesive agent on small pieces of amorphous metal, laminating the plurality of amorphous small pieces, and heat-press-bonding the lamination. As an example, a technology for manufacturing amorphous lamination material is described in Patent Document 3. However, coating an adhesive agent causes a problem of lowering the volume ratio of the core.

The basic structure of a permanent-magnet-synchronization electrical rotating machine is configured with a soft magnetic material, coils, and permanent magnets. The losses of such an electrical rotating machine can be roughly categorized into iron loss and copper loss. The iron loss is determined by the properties of a soft magnetic material. The copper loss is determined by the resistance value of the coil, in other words, by the volume ratio, wherein the more compact the structure of the winding is, the smaller the loss is. A method of increasing the efficiency can be attained by a design of the shape, dimensions and the like of an electrical rotating machine, which makes these losses to be low, however, a change in the properties of the material also contributes to high efficiency.

Employment of an axial gap electrical rotating machine is considered to be one of methods for decreasing the loss of a flat electrical rotating machine structure. A stator used for a radial electrical rotating machine which is flat and thin in the axis direction of the rotor shaft is in most cases given with a structure having a winding wire around a core part that is formed by punching electromagnetic steel plates and laminating the punched plates along the axial direction of a rotor shaft. However, because the ratio of the coil end portion of the coil becomes large with respect to the core part facing the rotor and being effective for torque output, the coil resistance value becomes large, which increases the copper loss. Accordingly, for the structure of flat electrical rotating machines, axial types in which the surfaces, of the core portions, contributable to the torque output and facing the rotors are arranged along the axial direction of the rotor shaft are effective for reducing the copper loss. Further, for the core portions, it is desirable to adopt a material with a high magnetic permeability and low iron loss in order to reduce the iron loss.

One basic structure of an axial gap electrical rotating machine is disclosed by Patent Document 4. Having a teeth portion and yoke portion, this structure has facing surfaces contributable to torque output only on one side with respect to the rotor axis direction. Further, because a magnetic flux flows from the teeth portion to the yoke portion in this structure, it is necessary to use a soft magnetic material for which a consideration is made so that a magnetic flux flows in the yoke portion three dimensionally. In order to satisfy these requirements, it is necessary to use a material, such as a powder magnetic core, whose magnetic characteristics has three dimensional isotropy, however, such a material has lower magnetic permeability and larger iron loss than commonly used silicon steel plates, causing a problem of difficulty with downsizing in obtaining an electrical rotating machine with a high output.

As a solution for solving the above-described problems, there is proposed a technology for an electric rotating machine described in Patent Document 5. With the electrical rotating machine described in Patent Document 2, an example is disclosed where a stator is provided with two surfaces in the axis direction of the rotor shaft, the surfaces facing rotors, and cores are structured with silicon steel plates. A method is disclosed in which, after a wire is wound around cores, and the cores are fixed by molding with a resin member to form a stator.

PRIOR ART DOCUMENTS

[Patent Document 1] U.S. Pat. No. 6,407,466
[Patent Document 2] Japanese Patent Application Laid-Open No. H05-114525

[Patent Document 3] Japanese Patent Application Laid-Open No. 2007-311652
[Patent Document 4] Japanese Patent Application Laid-Open No. 2005-287212
[Patent Document 5] Japanese Patent Application Laid-Open No. 2007-274850

DISCLOSURE OF THE INVENTION

Problems to be Solved by the Invention

An amorphous metal is contributable to the high efficiency of a motor because of the characteristics in energy saving and high magnetic permeability. As an amorphous metal is thin, hard, and fragile, the amorphous metal is difficult to be subjected to processing, such as punching-out or cutting, and has the problems that an optimal shape applicable to a motor cannot be formed by the technologies described as the related arts and that the manufacturing process becomes complicated.

Further, a method that performs mold-fixing with engineering plastic or the like, such as a thermoset resin, is conventionally used for an electrical rotating machine, however, the application of the method is limited to electrical rotating machines of a small capacity. It was difficult in terms of strength to apply a mold-fixing method to electrical rotating machines with requirement for a large toque or high rotational speed.

SUMMARY OF THE INVENTION

In an aspect of the invention, amorphous cores usable for an electrical rotating machine are provided.

Further, in an aspect of the invention, an axial gap motor using these amorphous cores is provided.

Further, in an aspect of the invention, there is provided an axial gap electrical rotating machine in a small size and with a high efficiency, wherein the axial gap electrical rotating machine satisfies the requirement of both downsizing and core-holding high-strength for an axial gap electrical rotating machine.

Further, in an aspect of the invention, an armature core used for an electrical rotating machine includes: a core portion having a lamination of a plurality of non-crystalline metallic foil bands; and resin for bond-fixing the non-crystalline metallic foil bands, wherein at least two cut surfaces are formed with respect to lamination layers.

Further, in an aspect of the invention, an amorphous material is used for the non-crystalline metallic foil bands.

Further, in an aspect of the invention, the cut surfaces are perpendicular to the lamination layers of the non-crystalline metallic foil bands.

Further, in an aspect of the invention, when the armature core is to be used for a motor, a resin portion on a gap side of the armature core has a thickness of 0.3 mm-0.5 mm.

Further, in an aspect of the invention, an armature core used for an electrical rotating machine includes: a core portion having a lamination of a plurality of non-crystalline metallic foil bands; and means for bond-fixing the non-crystalline metallic foil bands.

Further, in an aspect of the invention, an armature core used for an electrical rotating machine includes a core portion having a lamination of a plurality of non-crystalline metallic foil bands, wherein the non-crystalline metallic foil bands are connected between layers.

Further, in an aspect of the invention, an armature core used for an electrical rotating machine includes: a core portion having a lamination of a plurality of non-crystalline metallic foil bands; and a resin layer arranged on an outermost side of the lamination layers.

Further, in an aspect of the invention, edge portions of the resin layer are provided with an edge roundness of R.

Further, in an aspect of the invention, an armature core used for an electrical rotating machine includes: a core portion having a lamination of non-crystalline metallic foil bands in a ring form; and a resin layer covering the core portion, wherein the resin layer is provided with a recession.

Further, in an aspect of the invention, the core portion is exposed at the recession of the resin layer.

Further, in an aspect of the invention, an axial gap motor includes: a stator that has a plurality of stator cores extending along an axial direction and being disposed along a circumferential direction, and winding wires wound around the respective stator cores; and rotors having magnets facing the amorphous cores, wherein cut cores having an amorphous lamination are used as the stator cores.

Further, in an aspect of the invention, the magnets have a substantial rhombic shape.

Further, in an aspect of the invention, the magnets have a skewed shape.

Further, in an aspect of the invention, there is provided an axial gap electrical rotating machine, wherein a stator includes: a plurality of stator cores in a bar shape, the stator cores being disposed along a circumferential direction, wherein the axial line of a rotor shaft is the central axis of the circumferential direction, and wherein an axial direction of the stator cores is along the axial line direction AX of the rotor shaft; a stator core holding member in a disc form, the stator core holding member having a plurality of holes or recessions that are substantially in the same shape as the cross-sectional shape of the stator cores and disposed along the circumferential direction, wherein the axial line of the rotor shaft is the central axis of the circumferential direction; and coils wound around the stator cores. Herein, the stator cores are inserted in the holes or recessions of the stator core holding member and held by fixing in vicinities of respective central portions thereof, the central portions being around the axial direction thereof.

Further, in an aspect of the invention, it is possible to fix stator cores in the slot portions of the disc of a stator core holding member by press-inserting or shrink fitting, thereby realizing fixing with strength higher than the strength of fixing of stator cores by a conventional mold.

Further, in an aspect of the invention, the stator core holding member is formed of a conductive high strength metallic material and has notches along a radial direction, the notches extending from an outer circumferential edge thereof to the holes or recessions, and the outer circumferential edge divided by the notches along the circumferential direction is formed with a first outer circumferential edge portion in contact with an inner circumferential surface of a housing in a cylindrical shape for housing the stator and rotors, and a second outer circumferential edge portion forming a gap from the inner circumferential surface of the housing.

Further, in an aspect of the invention, in a case, for example, where the stator core holding member can be fixed by press-inserting to a housing in a cylindrical shape and is formed of a conductive material, such as metal, because the stator core holding member has notches extending, along the radial direction, from the outer circumferential edge thereof to the holes or recessions, and the second outer circumferential edge portion is not in contact with the housing, the stator core holding member is in a shape in which an eddy current path generated around the stator core holding member is partially cut off, and thereby the iron loss can be reduced.

Further, in an aspect of the invention, in addition to the above-described structures, there is further provided an axial gap electrical rotating machine having more than one above-described stators arranged along the axial direction of the rotor shaft.

Further, in an aspect of the invention, because the stator core holding member can be fixed to the housing with a high strength and high accuracy, there is provided an axial gap electrical rotating machine in which a plurality of above-described stators can be disposed in a single electrical rotating machine along the axial line direction of the rotor shaft.

In an aspect of the invention, there are provided amorphous cores applicable to an electrical rotating machine, enabling prevention of peeling-off of the cores and prevention of corrosion of gap surfaces.

Further, in an aspect of the invention, because processing of a cut core, that allows changes in the shape and dimensions in applying an amorphous metal to a motor is realized, improvement in the performance of a motor using an amorphous core can be expected. Further, because the forming process from a ribbon-formed amorphous metal to a cut core is simple and allows reduction in the cost, it is possible to obtain an economical motor.

Further, in an aspect of the invention, it is possible to provide a thin-shaped and highly-efficient motor with an axial gap structure using amorphous cores.

Further, in an aspect of the invention, it is possible to provide a highly-efficient and small-sized axial gap electrical rotating machine satisfying the requirement of both downsizing and core-holding high-strength for an axial gap electrical rotating machine.

BRIEF DESCRIPTION OF THE DRAWINGS

Objects and features of the invention will be clearer by the detailed description below with reference to the attached drawings.

FIG. 14A is a perspective view and FIG. 14B is a plan view;

FIGS. 15A to 15E illustrate a manufacturing method, shapes and the like of stator cores used for the stator of the electrical rotating machine in the third embodiment, wherein FIG. 15A is a perspective view illustrating the shape of the wiring core of electromagnetic steel plates before being cut into stator cores, FIG. 15B is a perspective view of a stator core formed by cutting the winding core, FIG. 15C is a perspective view of a stator core formed by powder compact forming from magnetic powders, FIG. 15D is a perspective view of a stator core formed by powder compact forming from magnetic powders, applying edge roundness at edge portions; and FIG. 15E is a perspective view of a stator core with a substantially rectangular cross-sectional shape;

FIG. 23B is an assembly perspective view;

FIGS. 24A and 24B illustrate a first modified example of the method for holding the magnets of the intermediate rotor of the electrical rotating machine in accordance with the fifth embodiment, wherein FIG. 24A is a spread perspective view and FIG. 24B is an assembly perspective view; and FIGS. 25A and 25B are illustrations of a second modified example of the method for holding the magnets of the intermediate rotor of the electrical rotating machine in accordance with the fifth embodiment, wherein FIG. 25A is a partial cross-sectional perspective view of the intermediate rotor and a perspective view of permanent magnets thereof, and FIG. 25B is an illustration of a position relationship, at the time of fixing, between the rotor disc and the permanent magnet at the portion A and portion B.

Figure 1A:
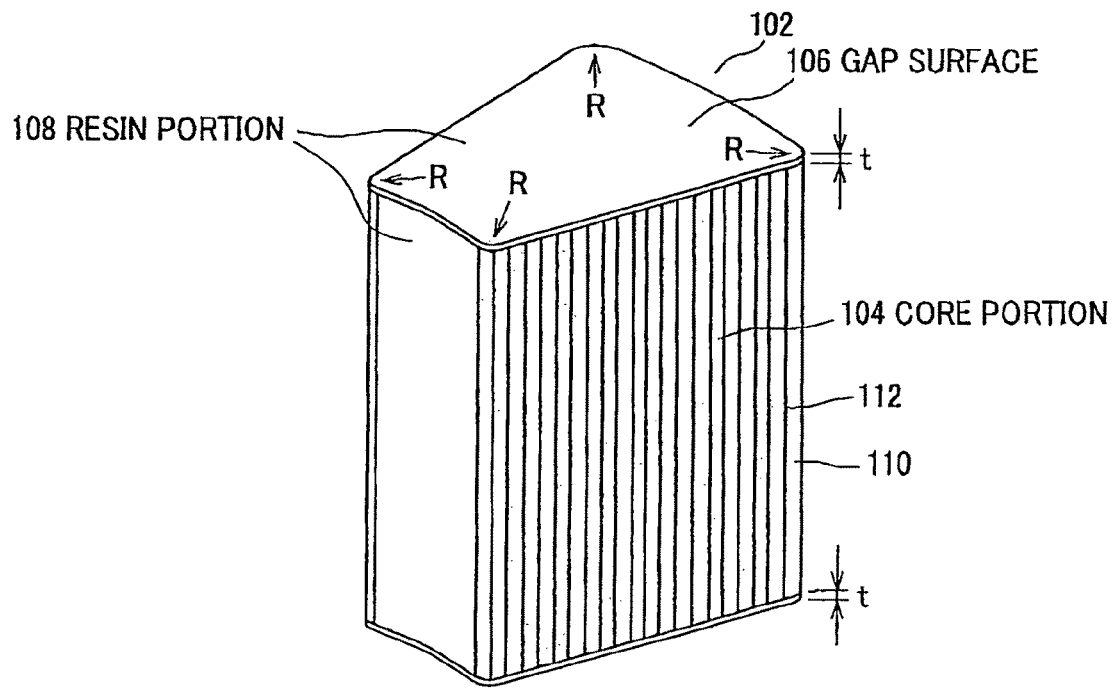
FIG. 1A shows an amorphous armature core related to one embodiment in accordance with the invention.

In the description, the same reference symbol is given to each same or virtually same component element.

DETAILED DESCRIPTION OF THE INVENTION

Embodiments in accordance with the invention will be described below, referring to the drawings.

First Embodiment

An embodiment in accordance with the invention will be described below, referring to FIGS. 1A to 6.

FIG. 1A shows an entire view of an amorphous core 102 in a first embodiment in accordance with the invention.

A core portion 104 of the amorphous core 102 is formed using amorphous metal (non-crystalline metal) elements 110 in a ribbon form (foil band) as an iron base to be in a laminated structure with sandwiched insulation resin material elements (hereinafter, referred to as resin) 112, wherein the amorphous metal elements 110 in the ribbon form are respectively bonded by the resin.

The core portion 104 is in a fan shape when viewed from the top or bottom.

Gap surfaces 106 at the top and bottom of the core portion 104 are provided with respective resin portions 108 being layers with an extremely thin thickness of mm so that the gap surfaces 106 are prevented from rusting. Further, the faces at the root side and the outer side of the fan shape of the core portion 104 are provided with layers of respective resin portions 108 to be prevented from rusting.

In order to arrange a later-described winding wire around the amorphous core 102, the contact portions between the winding wire and the amorphous core 102, in other words, the edge portions of the amorphous core 102 are provided with an edge roundness of R.

Figure 1B:
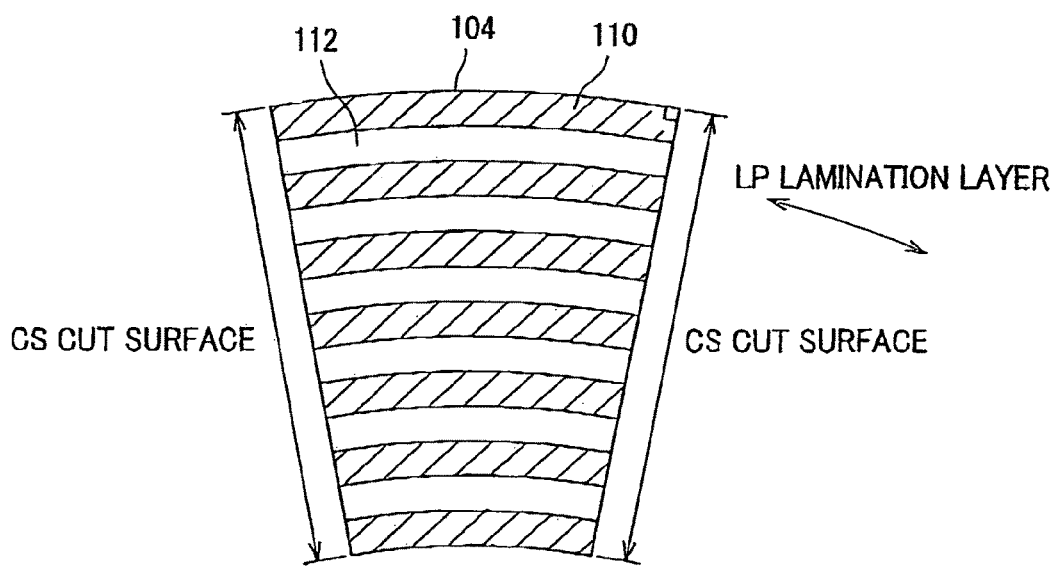
FIG. 1B shows a cross-section in parallel to the gap surface in FIG. 1A of the amorphous armature core related to the one embodiment in accordance with the invention.

FIG. 1B shows a cross-section of the above-described amorphous armature core, shown in FIG. 1A, the cross-section being parallel to the gap surfaces. The amorphous armature core has lamination of amorphous metal elements (non-crystalline metal elements) 110 and insulating resin material elements. 112 and has at least two cut surfaces CS with respect to lamination layers LP.

A manufacturing method of the amorphous core 102 will be described below.

<1: Iron Mold Forming Process>

Figure 2:
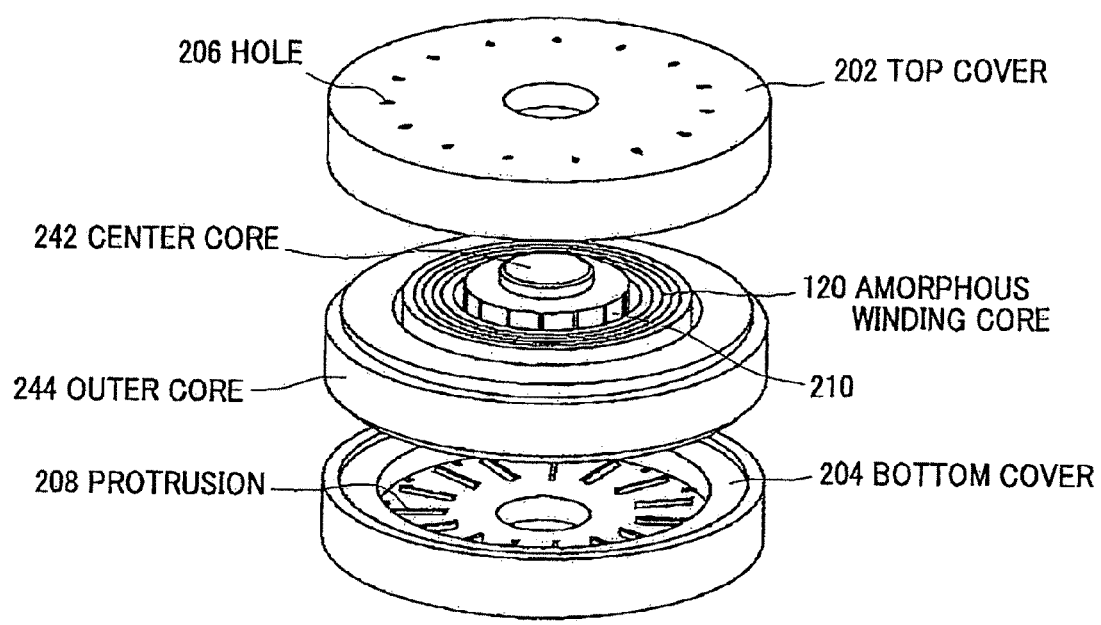
FIG. 2 shows a mold forming device for the amorphous care related to the one embodiment in the invention.

FIG. 2 shows a mold for mold forming of a core. The mold has a top cover 202, bottom cover 204, center core 242, and outer core 244. The top and bottom covers 202 and 204 are provided with holes 206 for injecting resin and protrusions 208 for forming grooves of the gap-surfaces. The center core 242 is provided with protrusions 210 for forming the recessions of the tape faces of the cores, and the outer core 244 is also provided with protrusions (not shown) on the inner side thereof. In the present embodiment, a protrusion 208 with a width of 2 degrees is arranged for every 24 degrees, and accordingly, grooves in a recessed shape with the width of 22 degrees for each are formed on the mold. Further, protrusions 208 are preferably formed in the entire circular range from 0 degree to 360 degrees. The amount of resin injected from the holes 206 can be controlled, and thereby a thin and uniform thin film can be formed. Accordingly, extremely thin resin layers with a thickness of 0.3 mm-0.5 mm are arranged on the gap surfaces 106 sides of the core portion 104, and thus the gap surfaces 106 can be prevented from rusting.

The grooves of the mold in the recessed shape are formed by the protrusions 208 as cut portions, so that armature cores have a structure, where the surfaces of the amorphous winding core 120 are exposed.

The mold preferably has a circular or substantially circular shape. As the bonding method for the ribbon formed amorphous metal elements 110, a bonding method by an adhesive agent, welding or the like can also be applied.

Figure 3:
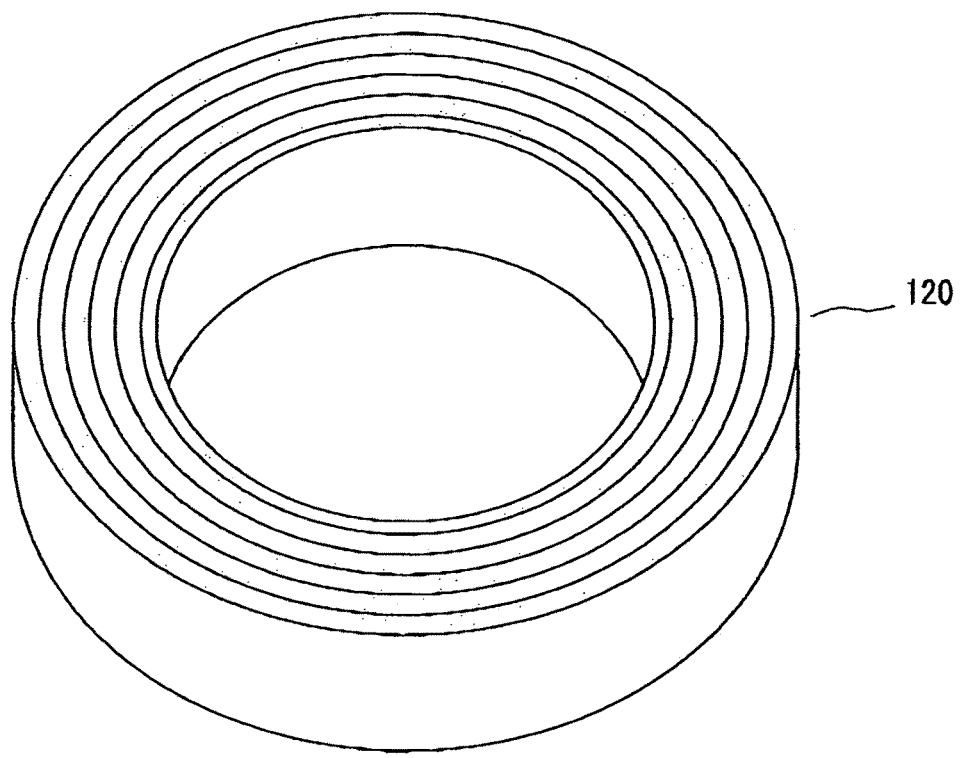
FIG. 3 shows a mold for the amorphous core related to the one embodiment in accordance with the invention.
Figure 4:
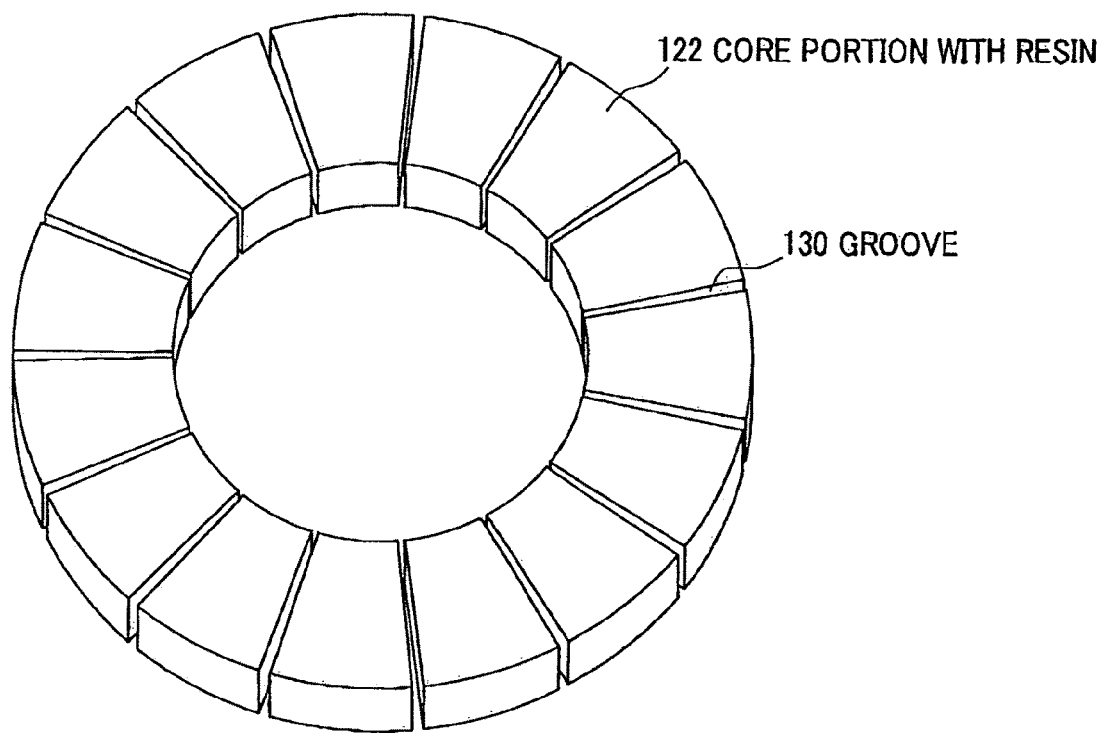
FIG. 4 shows amorphous cores in a ring-form related to the one embodiment in accordance with the invention.

An amorphous winding core 120, as shown in FIG. 3, is set in dies, then the dies are closed, and resin is injected from the holes 206. Then, vacuum impregnation is performed, and thus a large amount of resin is impregnated in the gaps between the ribbon-form amorphous winding core 120 and the mold, as shown in FIG. 4, and thus the mechanical strength at the time of cutting the grooves 130 of the amorphous core portion 122 with resin can be ensured.

That is, there is provided an armature core 102 used for an electrical rotating machine, wherein the armature core has a core portion 104 with lamination of a plurality of non-crystalline metal foil bands 110 and resin elements 112 for bonding the non-crystalline metal foil bands 110, and at least two cut surfaces CS with respect to the laminated surfaces LP. Further, the cut surfaces CS are perpendicular to the laminated surfaces LP of the non-crystalline metal foil bands.

Further, the gap side resin portions of the armature core to be used for a motor are arranged such as to have thickness t of 0.3 mm-0.5 mm.

Still further, the insulating resin material elements 112 function as means for bonding the non-crystalline metal foil bands. That is, the non-crystalline metal foil bands 110 are continuous between layers through the insulating resin material elements 112.

<2: Cutting Process>

Figure 5:
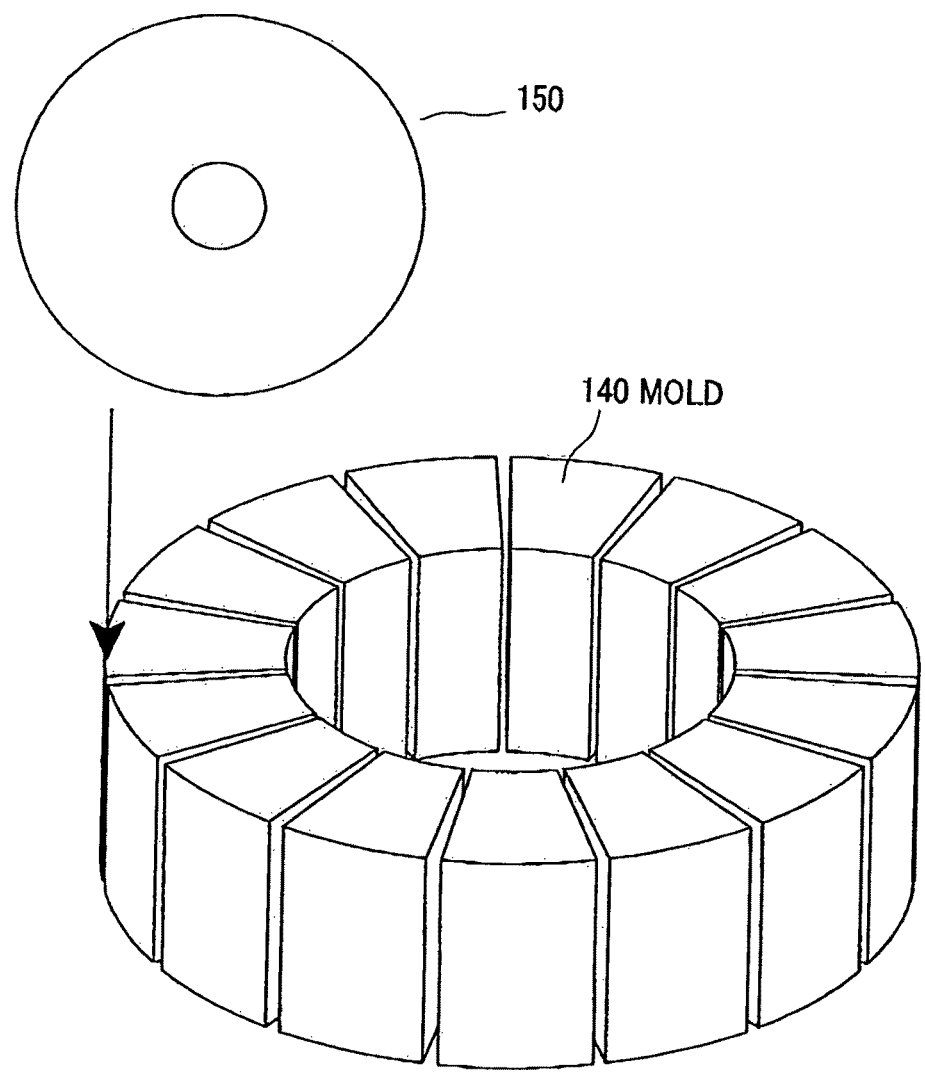
FIG. 5 shows an amorphous cut core related to the one embodiment in accordance with the invention.

FIGS. 4 and 5 show a cutting process for core portions 122 attached with resin. Cutting of the core surfaces is performed in cooling water, starting with the grooves 130 where the core surfaces are exposed, and thus molds 140 are formed. The core portions 122 attached with resin and the grooves 130 of the core portions, the core surfaces being exposed at the grooves 130, can reduce the stress caused at the time of cutting and prevent scattering of the lamination core. Further, with this method, heating before cutting described in Patent Document 2 is unnecessary. Still further, by arranging grooves 130, a preferable shape and dimensions of a cut core can be formed. In order to arrange a winding wire around the amorphous core 102, the contact portions between the winding wire 160 and the amorphous core 102 are provided with an edge roundness R.

Second Embodiment

Figure 6:
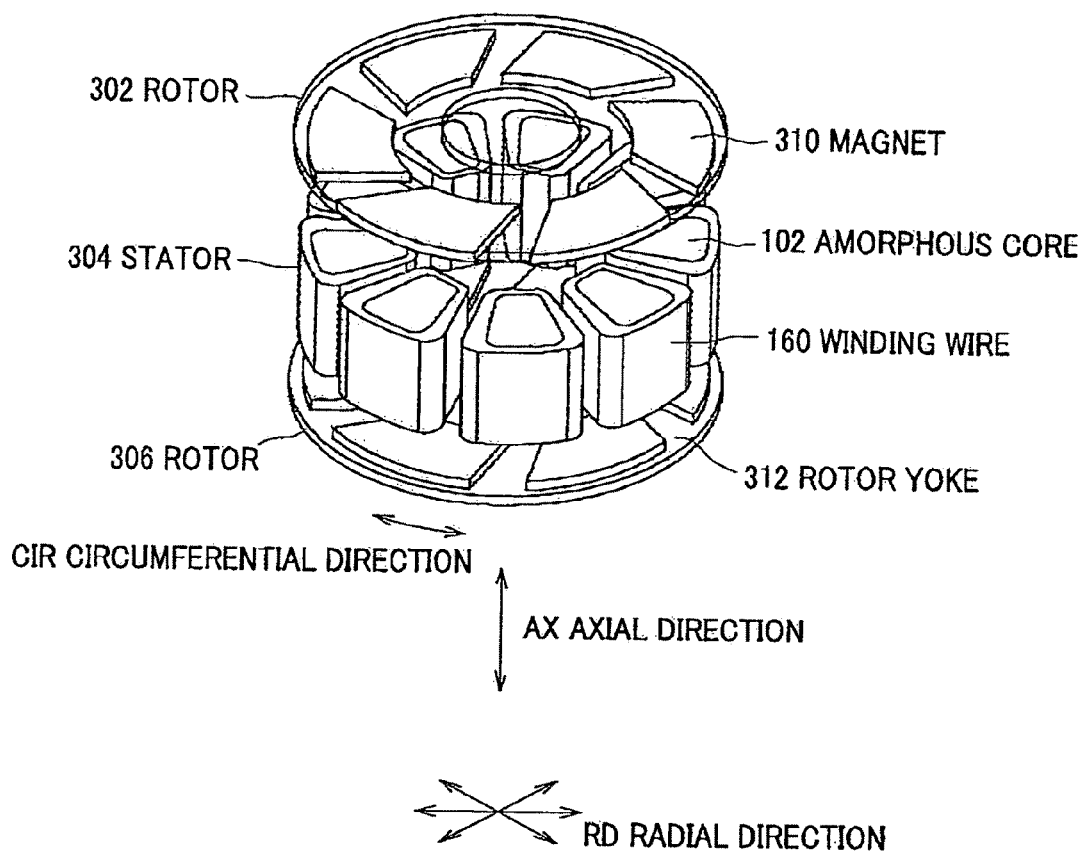
FIG. 6 shows an axial gap motor using the amorphous cores related to the one embodiment in accordance with the invention.

FIG. 6 shows an axial gap motor using the amorphous cores 102 in the first embodiment. The motor using amorphous cores in the present embodiment includes a stator 304 having a plurality of amorphous cores 102 for the stator and winding wires 160 for the stator, and rotors 302, 304 having ferrite magnets 310 in a substantially rhombic shape. The two rotors 302, 304 have a structure sandwiching the stator 304 therebetween, and the motor in the present embodiment has nine poles of the stator and six poles of magnets. However, the number of the poles of the armature and the number of poles of magnets can have a combination other than this. Further, depending on the case, it is possible to set the rotors in the present embodiment on a fixing side, and make the stator rotatable.

Figure 7:
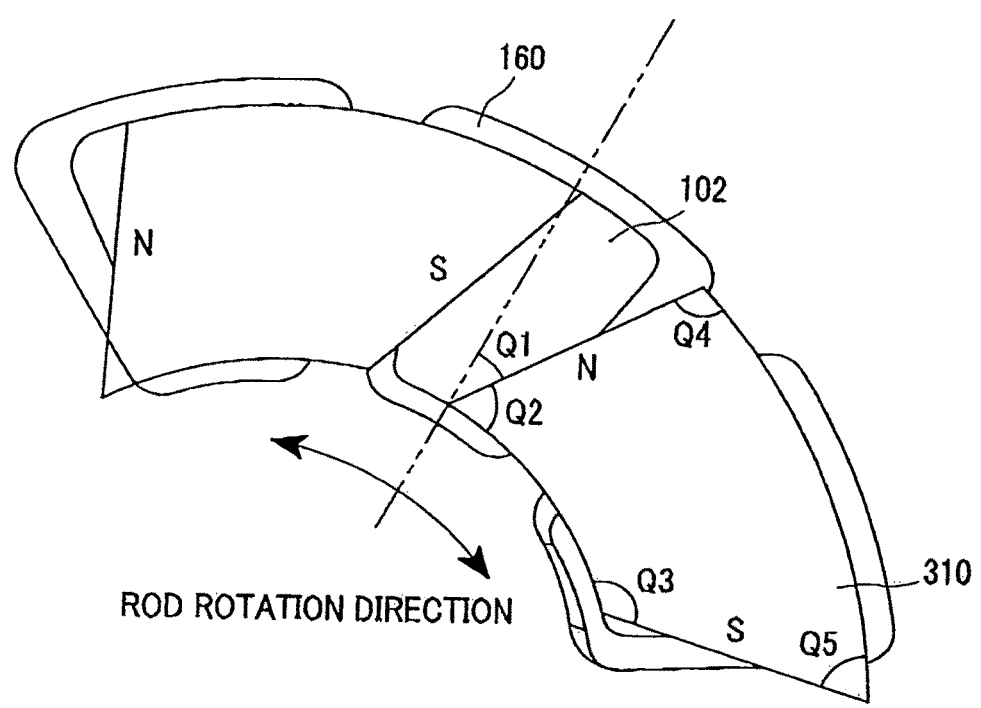
FIG. 7 shows a position relationship between the Magnets and stator cores of the axial gap motor related to the one embodiment in accordance with the invention.

FIG. 7 shows the detailed Shapes of the ferrite magnets 310, amorphous cores 102, and winding wire 160. FIG. 7 shows the shape of the motor, in FIG. 6, viewed from the top side. In order to reduce the cogging torque, the magnets 310 are provided with skews with a certain angle in the circular direction CIR (circumferential direction) and radial direction RD. With regard to the magnetic poles of the magnets 310, when the rotation direction ROD is specified, N poles are arranged in the forward direction, and S poles are arranged in the reverse direction. Further, the winding wire 160 is wound around the amorphous core 102 along the faces perpendicular to the motor axis. Incidentally, by controlling a flowing current, the motor in the present embodiment can be rotated in either direction.

Still further, as she shape of magnets 310 shown in FIG. 7, the magnets 310 have an angle θ1: 25° with respect to the center line, and angles θ2: 65°, θ3: 115°, θ4: 109°, and θ5: 71° as angles at the respective apexes of the member.

These winding wires 160 of the motor are connected with a power converter (not shown), and a power is supplied from the power converter and controlled so that rotation of the motor rotates at a required rotation speed.

Figure 8:
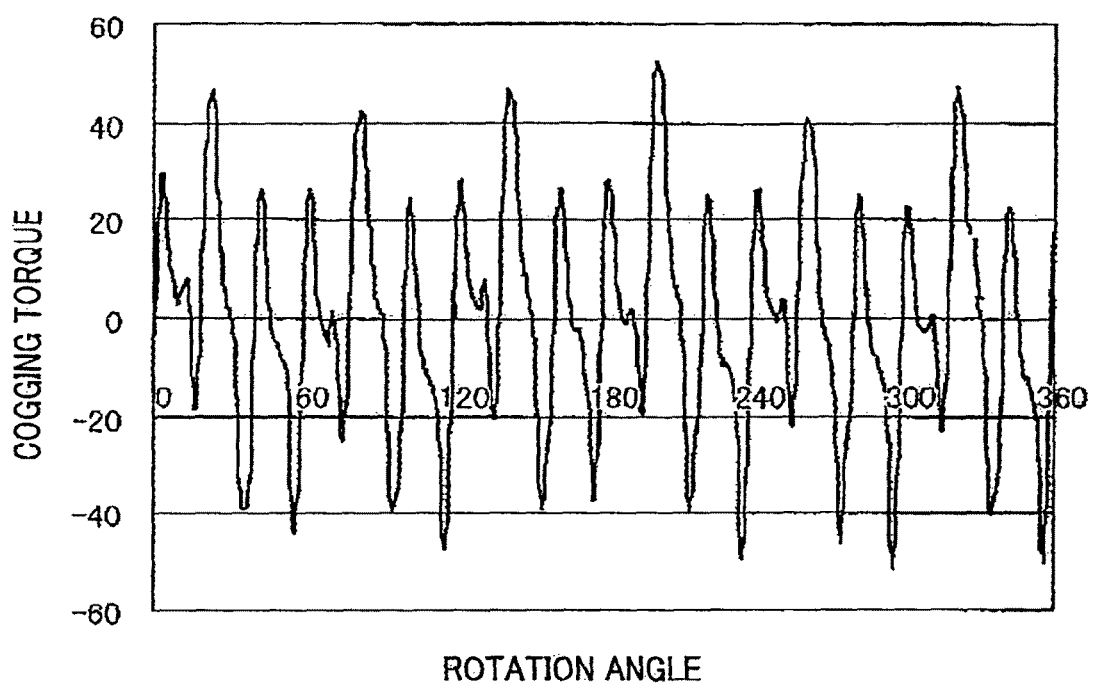
FIG. 8 shows the cogging torque waveform of the axial gap motor related to the one embodiment in accordance with the invention.
Figure 9:
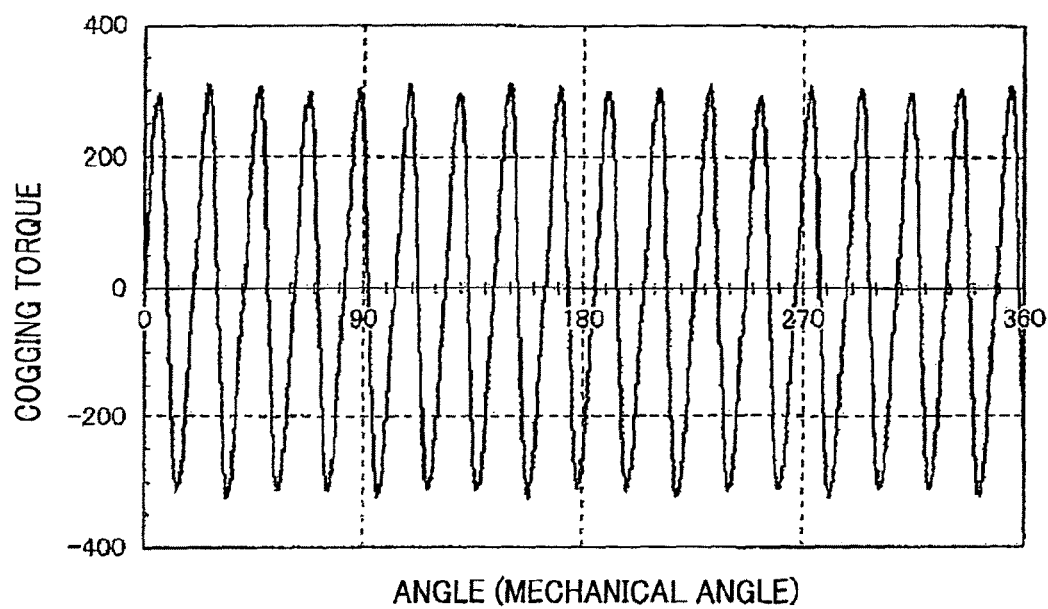
FIG. 9 shows the cogging torque waveform of a prior art.

FIG. 8 shows the waveform of the cogging torque in an embodiment of a motor, in accordance with the invention, with magnets in a substantially rhombic skewed shape. Further, FIG. 9 shows the waveform of the cogging torque of a motor using conventional full-circular magnets for the rotors.

From these test results, as compared with the conventional waveform of cogging torque, the cogging torque in this embodiment of a motor in accordance with the invention is low. This shows that the cogging torque can be reduced by forming the magnets 310 in a substantially skewed shape to be different from the shape of the stator 304 (amorphous cores 102 and winding wirings 160), as has been described in the present embodiment.

Figure 10:
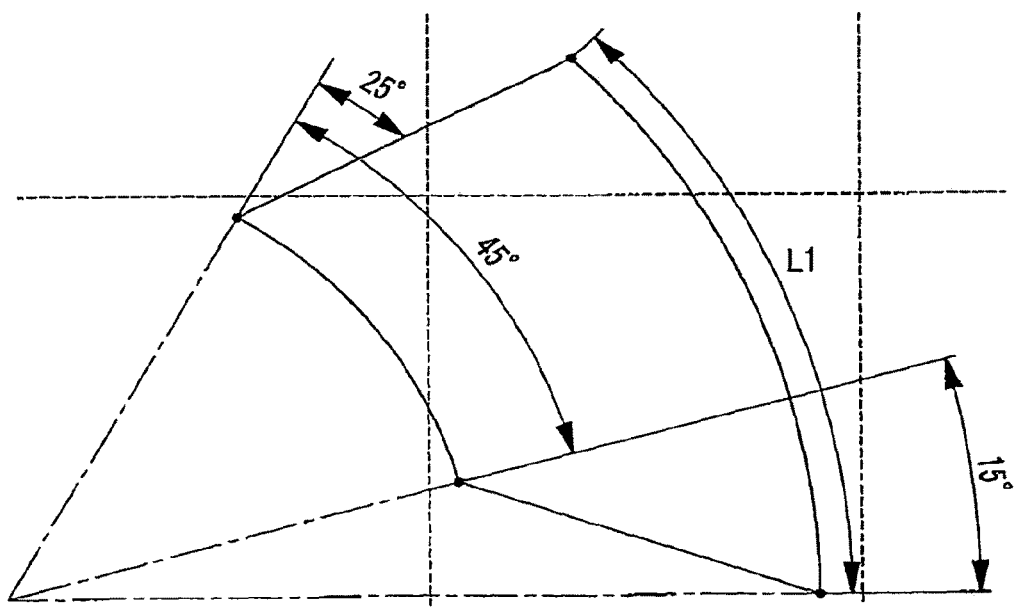
FIG. 10 shows the detailed shape of a magnet in the one embodiment in accordance with the invention.
Figure 11:
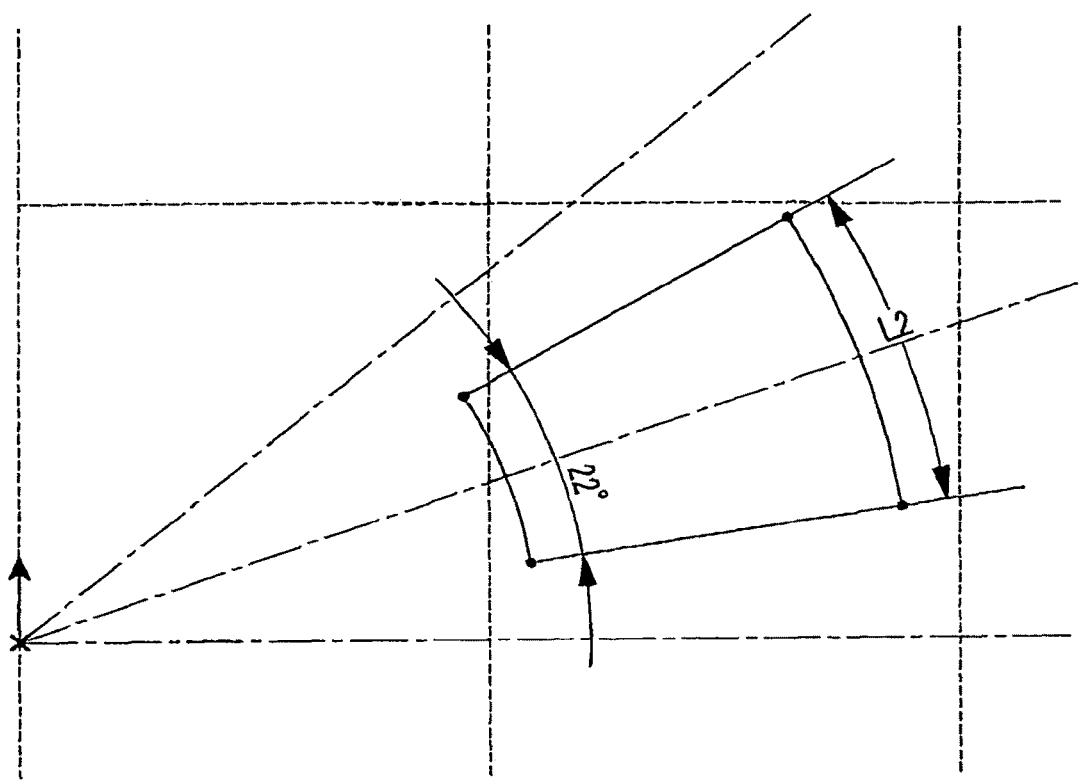
FIG. 11 shows the detailed shape of an amorphous core in the one embodiment in accordance with the invention.

FIG. 10 shows the detailed shape of the magnets, and FIG. 11 shows the detailed shape of the amorphous cores.

With the motor in the present embodiment in accordance with the invention, with regard to the skewed shape of the magnets 310 and representing the circular length of the magnets 310 by L1 and the circular length of the amorphous cores 102 by L2, the relationship of the ratio L2/L1 is set to be in a range 0.4-0.53, thereby the cogging torque being reduced.

Although, in the foregoing embodiment, structure where amorphous metal elements in a ribbon shape are bonded primarily by resin has been described, it is also possible, not by this bonding method, to form an entire amorphous core by connecting the amorphous metal elements in the ribbon shape between layers, using a bonding method by an adhesive agent, welding or the like.

Further, because amorphous cut cores are used in the foregoing embodiment, a motor with a low eddy current loss and a high efficiency is realized. Still further, as it is made possible to use ferrite magnets, reduction in the cost of a motor is realized.

Next, another embodiment in accordance with the invention will be described in detail, referring to FIGS. 12 to 20.

Third Embodiment

Figure 12:
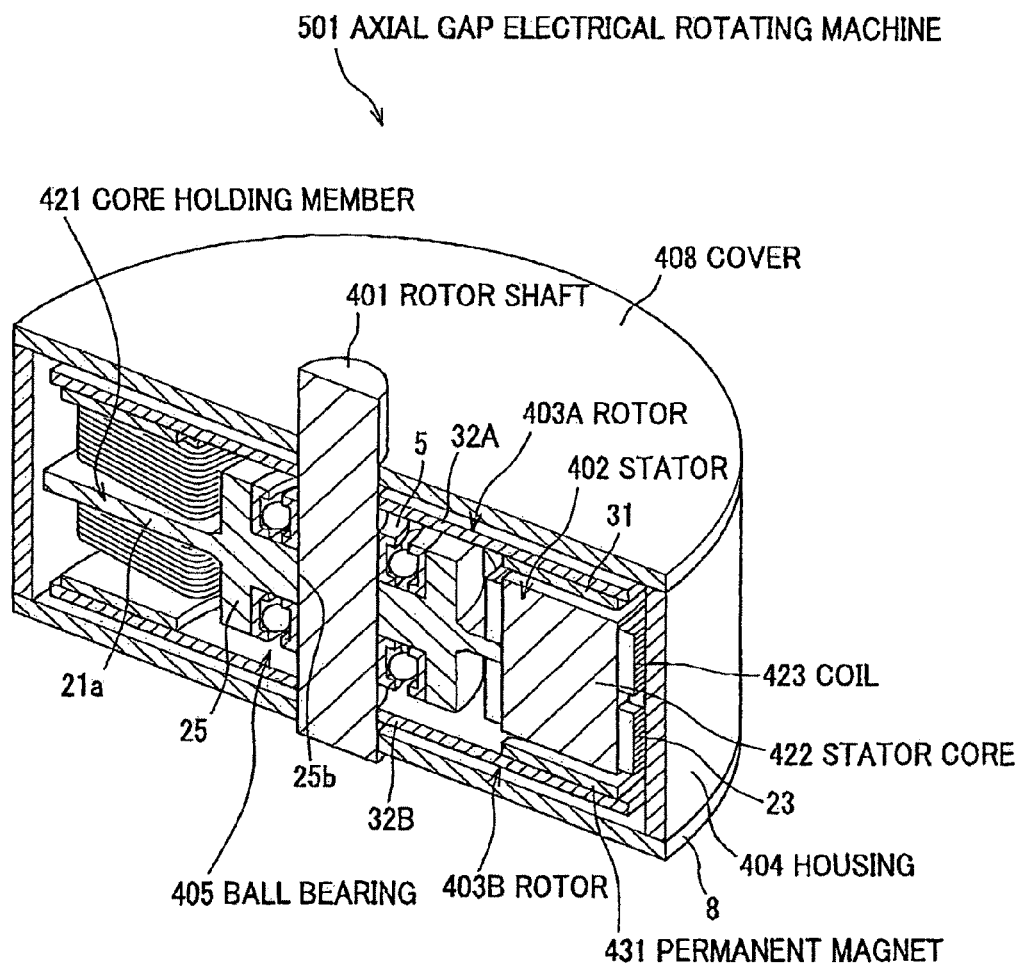
FIG. 12 is a partial cross-sectional perspective view of an electrical rotating machine in accordance with a third embodiment.
Figure 13:
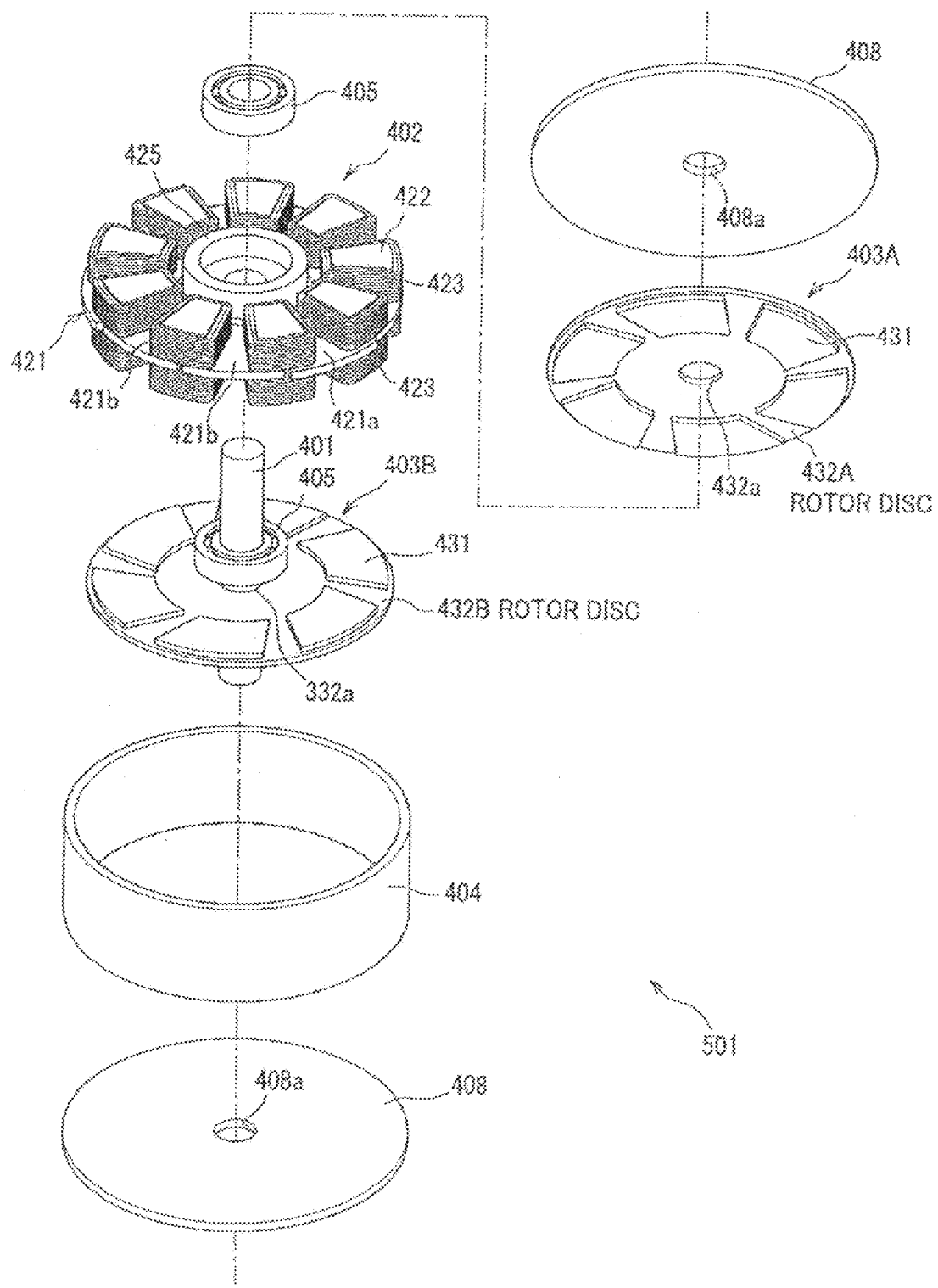
FIG. 13 is an exploded perspective view where component elements of the electrical rotating machine in accordance with the third embodiment are spread out along the rotor axis direction.
Figure 14A:
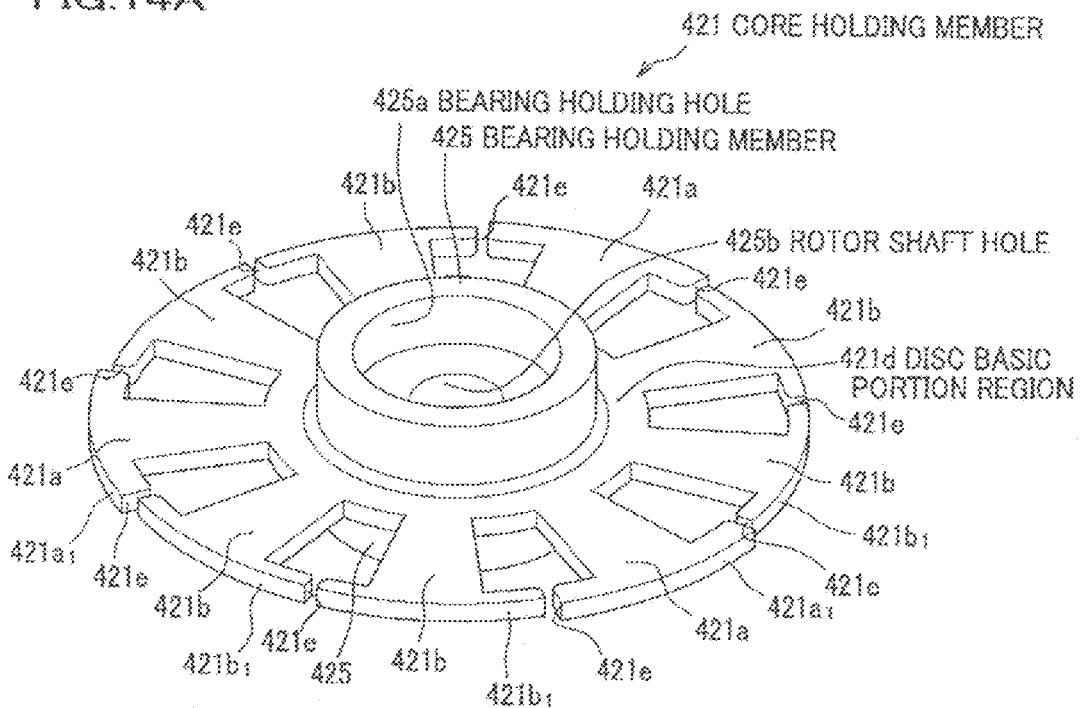
FIGS. 14A and 14B are structural views of a core holding member constructing the stator of the electrical rotating machine in accordance with the third embodiment, wherein diagram
Figure 14B:
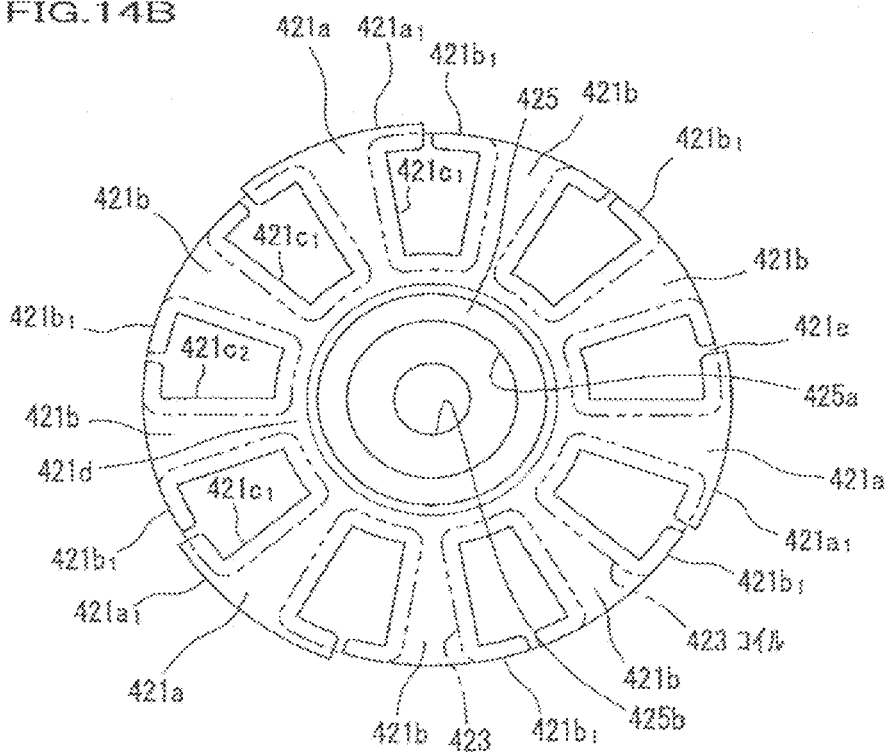

FIG. 12 is a partial cross-sectional perspective view of an electrical rotating machine in accordance with a third embodiment. FIG. 13 is an exploded perspective view where component elements of the electrical rotating machine in accordance with the third embodiment are spread out in the rotor axis direction. FIGS. 14A and 14B are structural views of a core holding member of a stator of the electrical rotating machine in accordance with the third embodiment, wherein FIG. 14A is a perspective view, and FIG. 14B is a plan view.

As shown in FIG. 12, this axial gap electrical rotating machine 501 (hereinafter, referred to merely as electrical rotating machine 501) includes a stator 402, and a pair of rotors 403A, 403B that are disposed facing the surfaces of the stator 402 with a certain gap, on the both sides of the stator 402 in the axial line direction (axial direction) AX of the rotor shaft 401. The stator 402 and rotors 404A, 403B are housed in a housing 404. Covers 408 in a disc form having a rotor shaft hole 408a at the central portion thereof (refer to FIG. 13) cover the outer surfaces (the top and bottom outer surfaces in FIG. 12) on the both sides in the axial direction AX of the rotor shaft 401.

Incidentally, the electrical rotating machine 501 is a three-phase permanent magnet synchronization motor.

<Rotor>

The respective rotors 403A, 403B also serve as back yokes having a rotor shaft hole 432a (refer to FIG. 13) at the center thereof. For example, on one side of each rotor disc 432A, 432B of electromagnetic steel plate or the like, permanent magnets 431 are periodically and adhesively fixed along the circumferential direction CIR with the axis line of the rotor shaft 401 being the central axis, and fixed by a key or the like, not shown, coaxially with the rotor shaft 401 that outputs rotational drive force.

The number of the permanent magnets 431 bonded to the rotor 403A, 403B is six, for example as shown in FIG. 13, and is not necessarily required to be the number of, pole members (for example, nine) formed by the stator core 422 and a pair of coils 423 sandwiching the core holding member (stator core holding member) 421 of the stator 402. Further, the planar shape of the permanent magnets 431 is not required to be the same as the cross-sectional shape of the stator cores 422.

However, when viewed from either the top side or bottom side in FIG. 13 of the rotor shaft 404, the permanent magnets 431 of the rotor 403A and the permanent magnets 431 of the rotor 403B are necessary to be periodically arranged at the same position in the circumferential direction CIR and in the same shape.

The rotor 403A in FIG. 13 is shown in a perspective view from the bottom side. The rotor 403B in FIG. 13 is shown in a perspective view from the top side. The angles between the tangential line of the circle having a center on the axial line of the rotor shaft 401 and the respective lines forming the outer shape of the permanent magnets 431 at the both ends thereof in the circumferential direction CIR are different from each other.

For example, in FIG. 13, a case is shown where the planar shape of the permanent magnets 431 is substantially rhombic. This is an example of a shape that reduces the torque pulse and cogging torque.

As the rotors 403A, 403B, it is also possible to employ a cage structure, magnetic material disc, conductive disc, rotor whose reluctances are different depending on the circumferential position, or the like, which do not use permanent magnets.

<Stator>

As shown in FIG. 12, in the stator 402, stator cores 422 in a bar shape constructing pole members are arranged with the axial direction thereof which is along the axial direction AX of the rotor shaft 401 and periodically along the circumferential direction CIR around the central axis on the axial line of the rotor shaft 401. A coil 423 is wound around each stator core 422.

As shown in FIG. 13, the stator 402 has a bearing holding member 425 on the inner side with respect to the radial direction. The bearing holding member 425 is provided with bearing holding holes 425a, 425a (refer to FIG. 14) being cylindrical hollow with a bottom on the both sides in the axial direction AX of the rotor shaft 401 to house and fix a ball bearing 405 therein. A core holding member 421 (refer to FIG. 12 and FIG. 14) substantially in a disc shape extends from the outer circumferential surface of the bearing holding member 425 outwardly in the radial direction.

The rotor shaft 401 has the bottom portion of the bearing holding holes 425a, and penetrates the bottom portion through a rotor shaft hole 425b (refer to FIG. 14) such as to ensure a gap from the outer circumferential surface of the rotor shaft 401 thereto.

Herein, both the core holding member 421 and bearing holding member 425 are made of a highly strong engineering plastic and are integrally formed.

As shown in FIGS. 14A and 14B, the core holding member 421 is arranged with an annular disc basic portion region 421d extending from the outer circumferential surface of the bearing holding member 425 to the outer, side with respect to the radial direction, and core holding regions 421a, 421b substantially in a fan shape which are continuous from the outer circumferential side, with respect to the radial direction, of the disc basic portion region 421d to the outer side with respect to the radial direction, the core holding regions 421a, 421b being disposed periodically along the circumferential direction CIR, for example, in the order of 421a, 421b, 421b, 421a, 421b, . . . .

Each core holding region 421a has an edge portion (a first outer circumferential edge portion) $421a_1$ on the outer side with respect to the radial direction thereof, the edge portion $421a_1$ extending to the both sides with respect to the circumferential direction CIR. Each core holding region 421b has an edge portion (a second outer circumferential edge portion) $421b_1$ on the outer side with respect to the radial direction thereof, the edge portion $421b_1$ extending to the both sides with respect to the circumferential direction CIR.

The distance of the outer side end of the edge portion $421a_1$, in the radial direction thereof, from the axial line (rotational central axis) of the rotor shaft 4'01 is set to be slightly larger than that of the outer side end of the edge portion $421b_1$. Accordingly, when the stator 402 is assembled into the housing 404, the outer circumferential surface of each edge portion $421a_1$ and the inner circumferential surface 404a (refer to FIG. 20) of the housing 404 come in contact with each other, and a gap is formed between the outer circumferential surface of each edge portion $421b_1$ and the inner circumferential surface 404a of the housing 404.

Further, between respective core holding regions 421a, 421b which are adjacent to each other along the circumferential direction CIR, a hole or recession $421c_1$ is formed in substantially the same cross-sectional shape as that of the stator core 422, a substantial fan shape, for example. Between respective core holding regions 421a, 421b which are adjacent to each other along the circumferential direction CIR, a hole or recession $421c_2$ is formed likewise in substantially the same cross-sectional shape as that of the stator core 422, a substantial fan shape, for example.

Further, notches 421e are formed between the respective ends, in the circumferential direction CIR, of edge portions $421a_1$ and the ends, in the circumferential direction CIR, of edge portions $421b_1$, and between the edge portions $421b_1$ and edge portions $421b_1$ being adjacent to each other in the circumferential direction CIR. Thus, between adjacent core holding regions 421a and 421b, and also between adjacent core holding regions 421b and 421b, the edge portions thereof are cut on the outer side with respect to the radial direction thereof.

Incidentally, the holes or recessions $421c_1$, $421c_2$ substantially in a fan shape have substantially the same planar shape, and are formed corresponding to the number of the pole members of the stator and periodically along the circumferential direction CIR with the axial line of the rotor shaft 401 being the central axis, for example, in the order of $421c_1$, $421c_1$, $421c_2$, $421c_1$, $421c_1$, and $421c_2$.

Incidentally, the corner portions of the circumferential edges of the holes or recessions $421c_1$, $421c_2$ are preferably provided with an edge roundness to avoid stress concentration.

In FIG. 14B, the positions of the outer shapes of coils 423 are shown with virtual lines so as to show the position relationship of the outer shapes of the coils 423, in a state that stator cores 422 have been insertion-fixed to the edge portions $421a_1$, $421b_1$ and in the holes or recessions $421c_1$, $421c_2$, and then the coils 423 are insertion-fixed to the stator cores 422.

<Stator Core>

Figure 18:
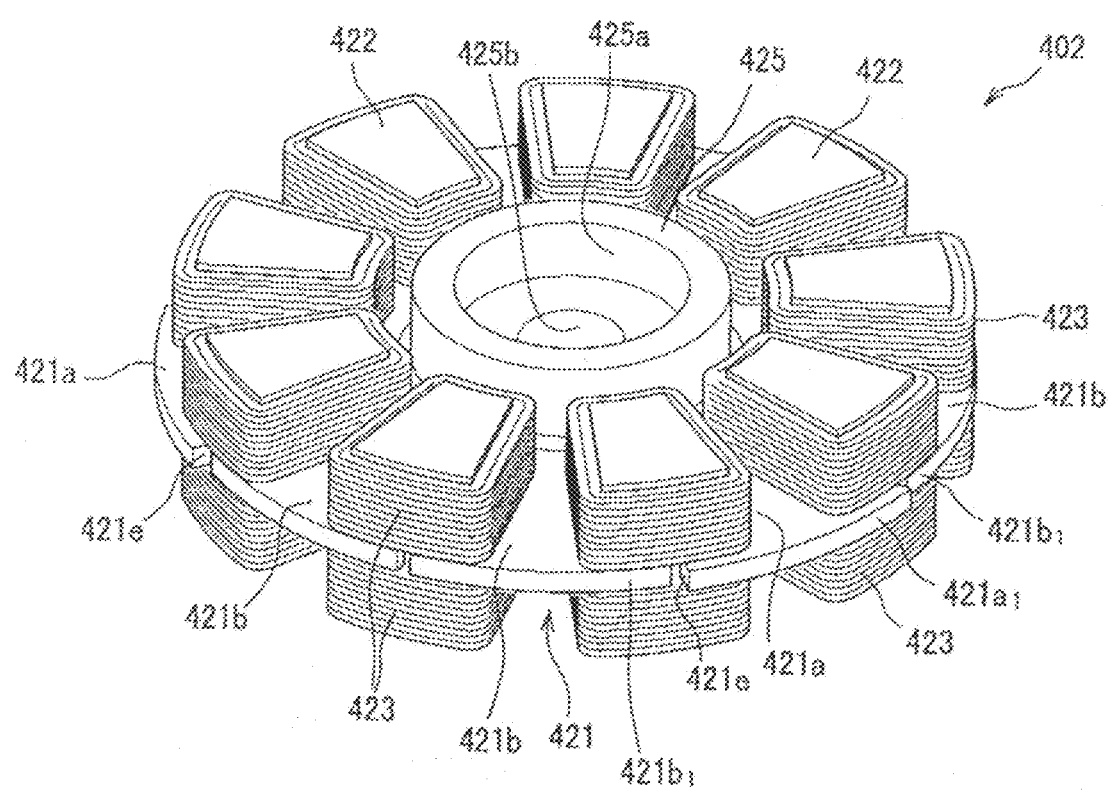
FIG. 18 is an entire perspective view of the stator of the electrical rotating machine in accordance with the third embodiment.
Figure 20:
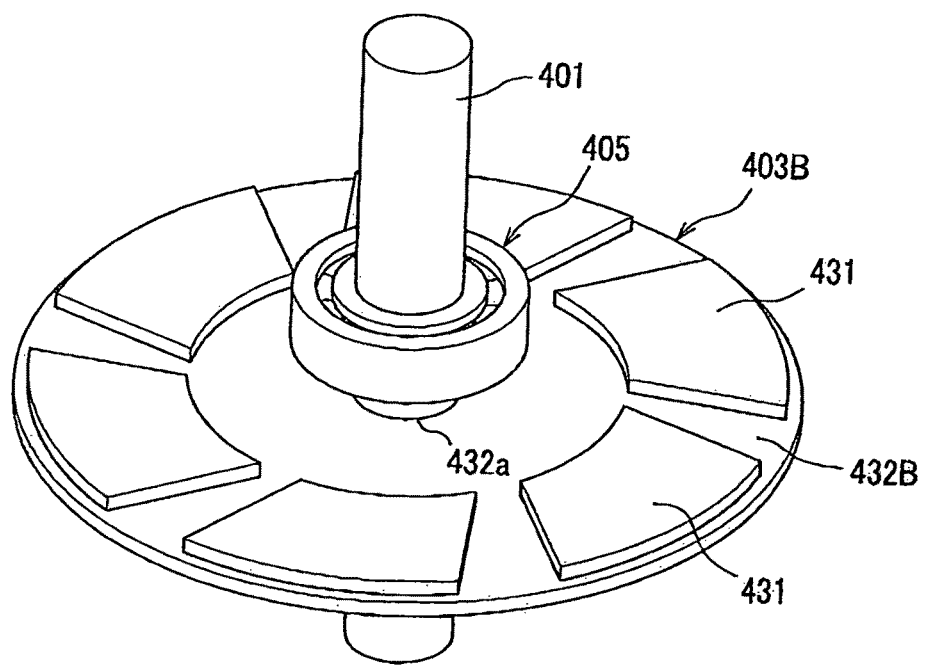
FIG. 20 is a perspective view of one rotor of the electrical rotating machine in accordance with the third embodiment.

Now, arrangement of a stator core 422 will be described, referring to FIG. 15. As the material for a stator core 422, a soft magnetic material, such as silicon steel plate, amorphous, powder magnetic core, permalloy, or permendur, can be employed. In a case of using thin plates of silicon steel plates, permalloy, or the like, a winding core 422' prepared as shown in FIG. 15A is subjected to annealing for distortion elimination, and bonded by resin, adhesive agent or the like, and cut into a predetermined shape, as shown in FIG. 15B, to be arranged as a stator core 422A (in FIG. 12, FIG. 13, and later-described FIGS. 16, 18, and 20, representatively shown as stator core 422).

Further, also in a case of using a foil band, such as amorphous, a core having a cross-sectional shape substantially in a fan shape can be obtained by a similar method.

Figure 15A:
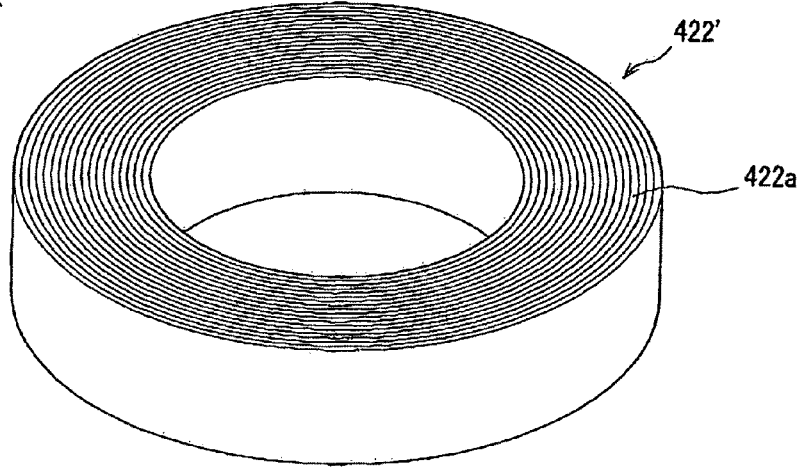
Figure 15B:
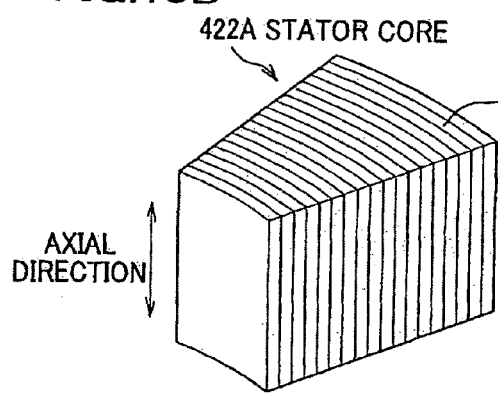
Figure 16:
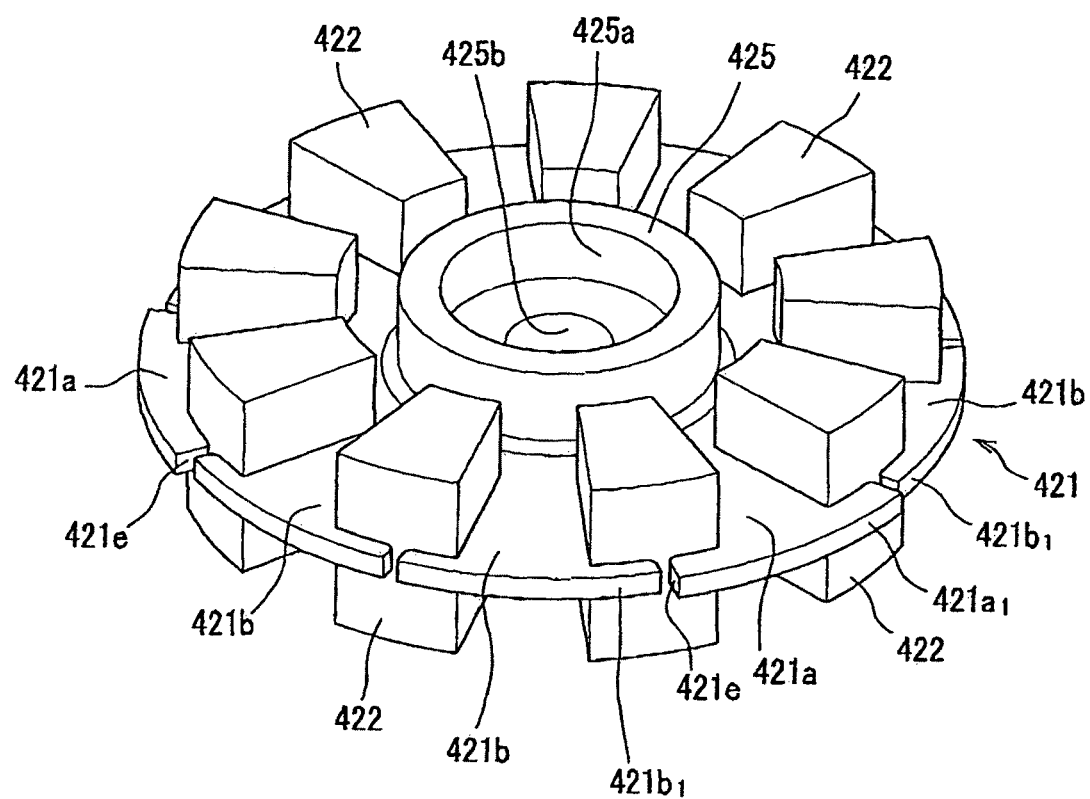
FIG. 16 is a perspective view of a stator after fixing stator cores to the core holding member constructing the stator.

Incidentally, in a case of using foil bands, such as amorphous, instead of cutting out from the shape of the winding core 422' shown in FIG. 15A, a core can be formed by directly winding foil bands, such as amorphous, such that the cross-section becomes a fan shape.

Figure 15C:
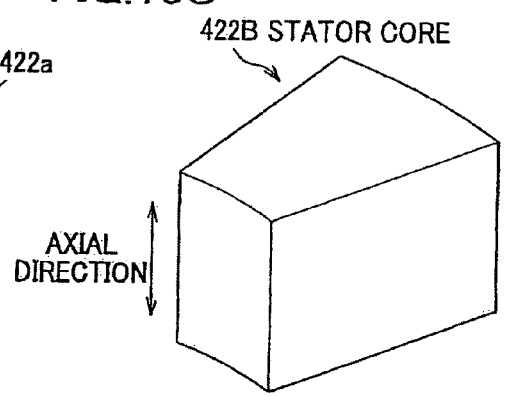
Figure 15D:
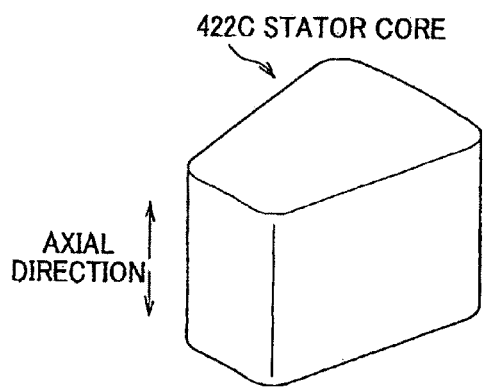

A stator core 422B of a powder magnetic core formed by powder compacting of magnetic powders coated with resin can be directly formed into a shape as shown in FIG. 15C. Further, it is also possible to make the stator core 422B anisotropic through forming such that the magnetic properties are excellent along the axial direction shown by the arrow. When a stator core 422 is formed of a powder magnetic core, because the cross-section with respect to the axial direction can be formed into any shape, it is possible to form the stator core into a shape with an edge roundness at edge portions like the stator core 422C shown in FIG. 15D.

Figure 15E:
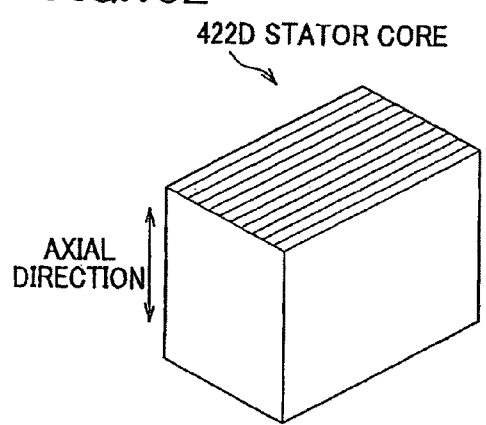

When a stator core 422 is formed from plates, a press-lamination method can be considered instead of the above. In this case, if a cross-sectional shape of a substantial rectangle, as shown in FIG. 15E, instead of a fan shape is applied, stator cores 422D can be manufactured also by such a method.

The cross-sectional shape of a stator core 422 is not limited to the above-described substantial fan shape or rectangle, and can be a circular shape or ellipse.

Next, referring to FIGS. 16 to 20, and FIGS. 13 and 14 as necessary, an assembling method of the stator 402 and an assembling method of the electrical rotating machine 501 will be described.

<Fitting of Core Holding Member to Stator Core>

FIG. 16 is a perspective view taken after the stator cores have been fixed to the core holding member of the stator.

As shown in FIG. 16, first, the stator cores 422 are press-inserted and fixed to the holes or recessions $421c_1$, $421c_2$ (refer to FIG. 14B) formed on the core holding member 421. That is, for example, the core holding member 421 is fixed on a jig table having a certain number of receiving holes with a depth for inserting the stator cores 422 into the holes or recessions $421c_1$, $421c_2$ from one side and protruding the stator cores 422 to the opposite side, and the stator cores 422 are press-inserted sequentially one by one from the one side. Thus, the central portions, around the axial direction, of the stator cores 422 can be easily fixed and held by the core holding member 421. Herein, formation of the notches 421e allows the core holding regions 421a, 421b to move along the circumferential direction CIR at the time of press-inserting, and thereby cracking of the holes or recessions $421c_1$, $421c_2$ is prevented. Further, the corners of the edges of the holes or recessions $421c_1$, $421c_2$ are given with edge roundness as described above, and thereby cracking at the corner portions upon press-insertion of the stator cores 422 can be prevented.

<Fitting of Coils to Stator Cores>

Figure 17:
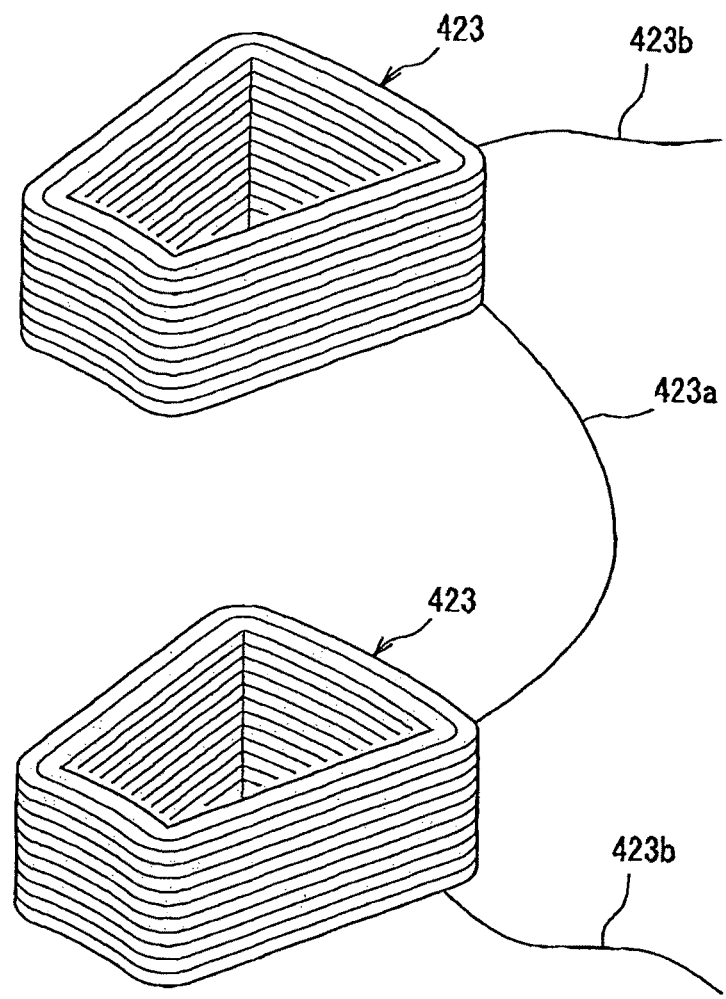
FIG. 17 is an illustration of a method of fitting coils to the stator cores.

FIG. 17 is an illustration of a method for fitting coils to stator cores. FIG. 18 is an entire perspective view of the stator of the electrical rotating machine in accordance with the third embodiment.

Coils 423, 423 are connected with each other through the winding wire intermediate portion 423a to be arranged as coils of one pole component. This coil manufacturing method can be a method of assembling coils wound around insulating bobbins, a method of direct winding of wires around the stator cores 422, or the like. Herein, because connecting at the winding wire intermediate portion 423a of coils would require a complicated manufacturing process if carried out in a later process, it is preferable that winding of two coils 423, 423 disposed along the axial direction of the stator cores 422 are continuously carried out in advance, and the winding wire intermediate portion 423a is provided, for which assembly is carried out from the both sides along the axial direction. Further, a method can be considered for streamlining of wiring where coils 423 are connected continuously from the winding wire ends 423b, 423b, and coils in the same phase are continuously wound for assembling a 3-phase electrical rotating machine. By a procedure as described above, the stator 402 of the electrical rotating machine 501 can be obtained.

Concrete description will be made below, taking an example. Similarly to the connection, as shown in FIG. 17, of two coils 423 at the winding wire intermediate portion 423a, using two insulating bobbins (not shown) with the same cross-sectional shape of the stator cores 422, coils 423 for one pole member are formed. Then, as shown in FIG. 18, coils 423, 423 for one stator core 422 are inserted from the both sides of the core holding member 421. Herein, wire winding direction is set to be the same around the axis line direction AX of the rotor shaft 401 in assembling. Then, the coils 423 are impregnated with resin or the like to bond the coils 423 to the stator core 422.

Incidentally, the wiring ends 423b, 423b may be connected with coils 423 for other pole components in the same phase.

The winding wire intermediate portion 423a and winding wire ends 423b are bonded to the core holding regions 421a, 421b of the stator 402 with resin or the like so as not to contact the rotors 403A, 4038.

<Fitting of Stator to Housing>

Next, a method for fixing the stator 402 to the housing 404 will be described, referring to FIG. 19.

Figure 19:
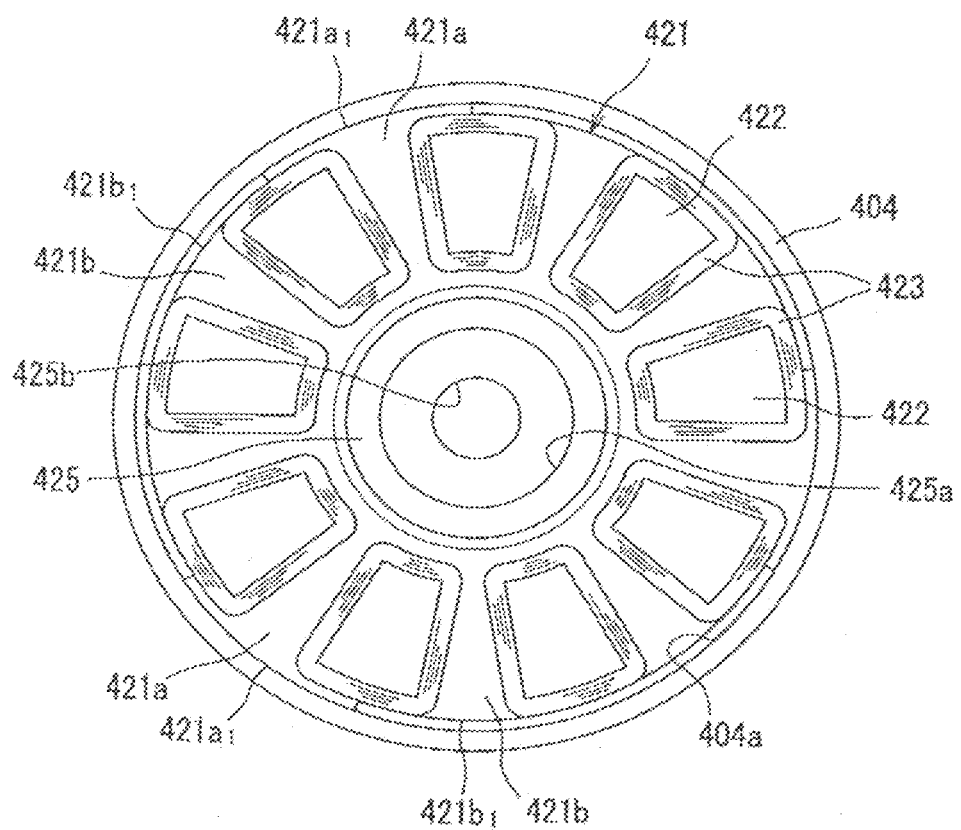
FIG. 19 is an illustration showing a position relationship, at the time of fixing, between the outer circumferential edge of the stator and the inner circumferential surface of the housing in the electrical rotating machine in accordance with the third embodiment.

FIG. 19 is an illustration showing a position relationship, at the time of fixing, between the outer circumferential edge of the stator and the inner circumferential surface of the housing in the electrical rotating machine in accordance with the third embodiment.

As shown in FIG. 19, the stator 402 is press-inserted into the housing 404 in a cylindrical shape so that the stator 402 and housing 404 can be fixed to each other. As described above, only the edge portions of the core holding regions 421a in a fan shape of the core holding member 421 come in contact with the inner circumferential surface 404a of the housing 404 and thus fixed.

Incidentally, although not shown in FIG. 19, a ball bearing 405 is already insertion-fixed to the bearing hole 425b on the upper side in FIG. 19.

<Assembly of Stator and Rotors>

FIG. 20 is a perspective view of one rotor of the electrical rotating machine in accordance with the third embodiment.

Referring to FIG. 13 and FIG. 20, an assembly procedure of the rotors 403A, 403B to the stator 2 will be described.

First, as shown in FIG. 20, the rotor shaft 401 is inserted into the rotor shaft hole 432a of the rotor 403B from one side with respect to the axial line direction AX, and then fixed integrally with the rotor shaft 401 by a key or the like. Next, in FIG. 20, a ball bearing 405 fitted to the rotor shaft 401 on the upper side of the rotor 403B. Then, in FIG. 13, the rotor shaft 401 is inserted from the lower side into the rotor shaft hole 425b of the stator 402 already fixed to the housing 404, and the ball bearing 405 fitted around the rotor shaft 401 is fitted into the bearing holding hole 425a on the lower side of the stator 402. Herein, the rotor disc 4323 held at a position on the lower end side of the bearing holding member 425 is in a position relationship such as to have a gap dimension designed in advance between the permanent magnets 431 and the facing surfaces of the stator cores 422.

The rotor shaft 401 is in a state of projecting to the upper side of the stator 402 in FIG. 13. On this upper side, a ball bearing 405 is fitted into the bearing holding hole 425a on the upper side of the stator 402, and the rotor shaft 401 is penetrated through the rotor axis hole 432a of the rotor disc 432A. Thus, assembly is carried out with a position relationship for the position in the axial line direction AX to have a gap dimension designed in advance. Herein, the rotor disc 432A held at a position on the upper end side of the bearing holding member 425 is in a position relationship such as to cause a gap dimension designed in advance between the permanent magnets 431 and the facing surfaces of the stator cores 422.

Finally, the upper and lower covers 408 in FIG. 13 are fitted to the housing by a method of adhesive bonding or the like.

Incidentally, a circuit board for 3-phase power to be supplied to the respective pole components of the stator 2 may be arranged inside one of the covers 408.

The electrical rotating machine 501 in the present embodiment is shown such that the rotor shaft 401 is a straight shaft and is fixed by press-insertion to the inner rings of the ball bearings 405 and the rotor shaft holes 432a, 432a of the rotor discs 432A, 4326. However, practically, by employing a stepped shaft, the dimension relationship along the axial direction can be maintained with high accuracy. Because the bearing holding member 425 and core holding member 421 are arranged to be firmly fixed to the housing 404, a structure capable of obtaining rotation output from the rotor shaft 401 (output shaft) is realized with a structure externally fixing the housing 404.

Modification of Third Embodiment

Incidentally, in the present embodiment, the outer side, with respect to the radial direction, of the disc basic portion region 421d (refer to FIG. 14) of the core holding member 421 divided along the circumferential direction CIR by the core holding regions 421a, 421b, however, without being limited thereto, the outer side, with respect to the radial direction, of the disc basic portion region 421d may have a mere shape of an annular disc region formed with holes or recessions $421c_1$, $421c_2$ substantially in a fan shape. In this case, it is unnecessary to provide notches $421e$, and a shape whose outer circumferential portion is partially extending outward in a certain amount may be applied.

According to the present embodiment and the modification thereof, because the core holding member 421 is made of engineering plastic, an eddy current due to the rotation of the rotors 403A, 403B is not caused in the core holding member 421, which realizes an electrical rotating machine with little iron loss and with high efficiency.

Fourth Embodiment

Now, a fourth embodiment in accordance with the invention will be described, referring to FIGS. 12 to 20.

In the third embodiment, the core holding member 421 and bearing holding member 425 are made of a highly strong engineering plastic and integrally formed, however, the invention is not limited thereto.

In the present embodiment, a core holding member 421 and bearing holding member 425 are individually manufactured. Herein, the core holding member 421: is made of, for example, a metallic material with high strength, such as an aluminum alloy or steel plates; is provided at the central portion thereof with a circular hole for inserting the bearing holding member 425 of steel substantially in a cylindrical shape; and is substantially in a disc shape formed with holes or recessions $421c_1$, $421c_2$ with, for example, substantially in a fan shape, the holes or recessions being substantially in the same shape as the cross-sectional shape of the stator cores 422, as shown in FIG. 14, in the third embodiment. The bearing holding member 425 is fittingly fixed into the hole at the above-described central portion of the core holding member 421 by a method, such as press-insertion, shrink fitting, gap fitting, or the like.

Incidentally, the bearing holding member 425 has the same shape as in the third embodiment.

Further, before the stator cores 422 are fittingly fixed into the holes or recessions $421c_1$, $421c_2$, at least either the edge portions of the holes or recessions $421c_1$, $421c_2$, or the side faces of the stator cores 422, are subjected to coating for electrical insulation. Thereafter, the stator cores 422 are subjected to a method, such as press-inserting, shrink fitting; or gap-fitting, so that the central portions, around the axial direction, of the stator cores 422 are fixed to the core holding member 421.

As coating for electrical insulation, coating by a non-conductive material, such as ceramic or resin, is more suitable than mere painting because of resistance against peeling-off by press-fitting and the like. If painting is adopted, baking/painting is preferable.

The distance of the outer end, with respect to the radial direction, of a edge portion $421a_1$ from the axial line (rotational central axis) of the rotor shaft 401 is set to a little larger than that of the outer end, with respect to the radial direction, of a edge portion $421b_1$. Accordingly, when the stator 402 is assembled to the housing 404, the outer circumferential surface of each edge portion $421a_1$ and the inner circumferential surface 404a (refer to FIG. 20) of the housing 404 come in contact with each other, and a gap is formed between the outer circumferential surface of each edge portion $421b_1$ and the inner circumferential surface 404a of the housing 404.

Further, similarly to the description in the third embodiment with reference to FIG. 14, there are formed respective notches $421e$ between the end, with respect to the circumferential direction CIR, of each edge portion $421a_1$, and the end, with respect to the circumferential direction, of a edge portion $421b_1$, the edge portion $421a_1$ and edge portion $421b_1$ being adjacent to each other with respect to the circumferential direction CIR. Further, there are formed respective notches $421e$ between the end, with respect to the circumferential direction, of each edge portion $421b_1$, and the end, with respect to the circumferential direction, of a edge portion $421b_1$, the edge portions $421b_1$ being adjacent to each other with respect to the circumferential direction CIR. Thus, between adjacent core holding regions $421a$, $421b$, and also between adjacent core holding regions $421b$, $421b$, the edge portions thereof are cut on the outer side with respect to the radial direction thereof.

In assembling the stator 402 (refer to FIG. 12) in the present embodiment into the housing 404, the stator 402 is subjected to a method, such as shrink fitting, press-insertion, gap-fitting, or the like, along the axial direction AX of the rotor shaft 401, and thereby the housing 404 and the stator 402 can be fixed to each other. Herein, the core holding member 421 withstands the stress due to press-insertion or shrink fitting, because a material with a sufficient strength is used for the core holding member 421.

Further, when the stator 402 is assembled into the housing 404, the outer circumferential surface of each edge portion $421a_1$ and the inner circumferential surface 404a (refer to FIG. 20) of the housing 404 come in contact with each other, while a gap is formed between the outer circumferential surface of each edge portion $421b_1$ and the inner circumferential surface 404a of the housing 404. Accordingly, although eddy current is caused in the core holding member 421 by a magnetic flux flowing through the stator cores 422 of the electrical rotating machine 501, along a direction interfering with the flux, a current path flowing around the stator cores 422 can be cut off even when the housing 404 is made of a conductive material, such as steel plates, or aluminum alloy. Needless to say, when the housing 404 is made of a conductive material, such as steel plate or aluminum alloy, it is desirable that at least either the outer circumferential surface of each edge portion $421a_1$ or the inner circumferential surface 404a of the housing 404 is coated for electrical insulation as described above.

Further, because at least either the side faces of the stator cores 422 or the edge portions of the holes or recessions $421c_1$, $421c_2$ are coated for electrical insulation, it is possible to reduce generation of eddy current loss caused by electrical conduction between the edge portions of the holes or recessions $421c_1$, $421c_2$ of the core holding member 421 holding the stator cores 422, and the stator cores 422.

In accordance with the present embodiment, because the bearing holding member 425 and the core holding member 421 are firmly fixed to the housing 404, a higher rotation output from the rotor haft 401 (output shaft) than in the case of the third embodiment can be obtained, with a structure that externally fixes the housing 404.

Fifth Embodiment

Now, an electrical rotating machine in accordance with a fifth embodiment will be described, referring to FIGS. 21 to 25.

Figure 21:
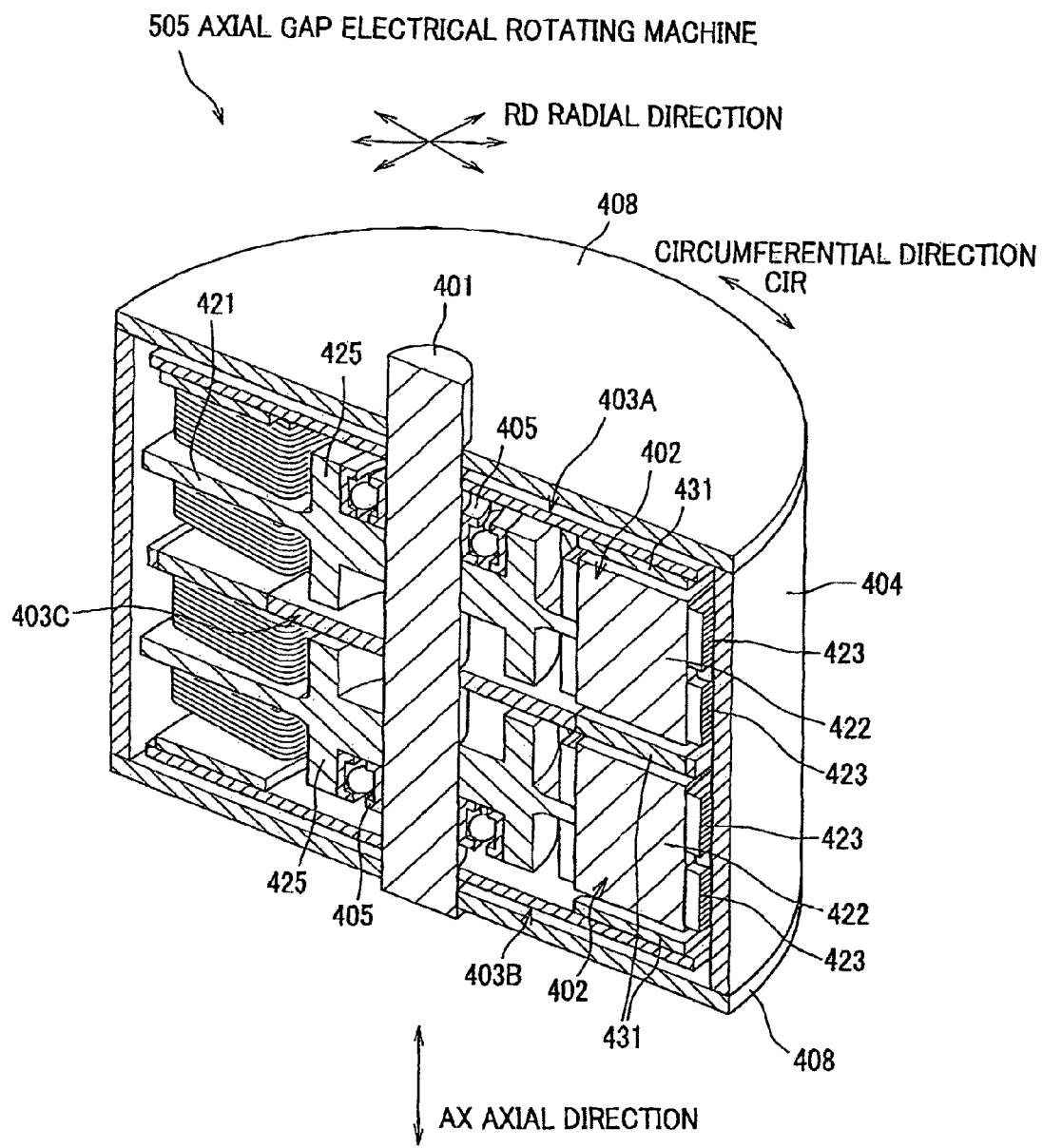
FIG. 21 is a partial cross-sectional perspective view of an electrical rotating machine in accordance with a fifth embodiment.
Figure 22:
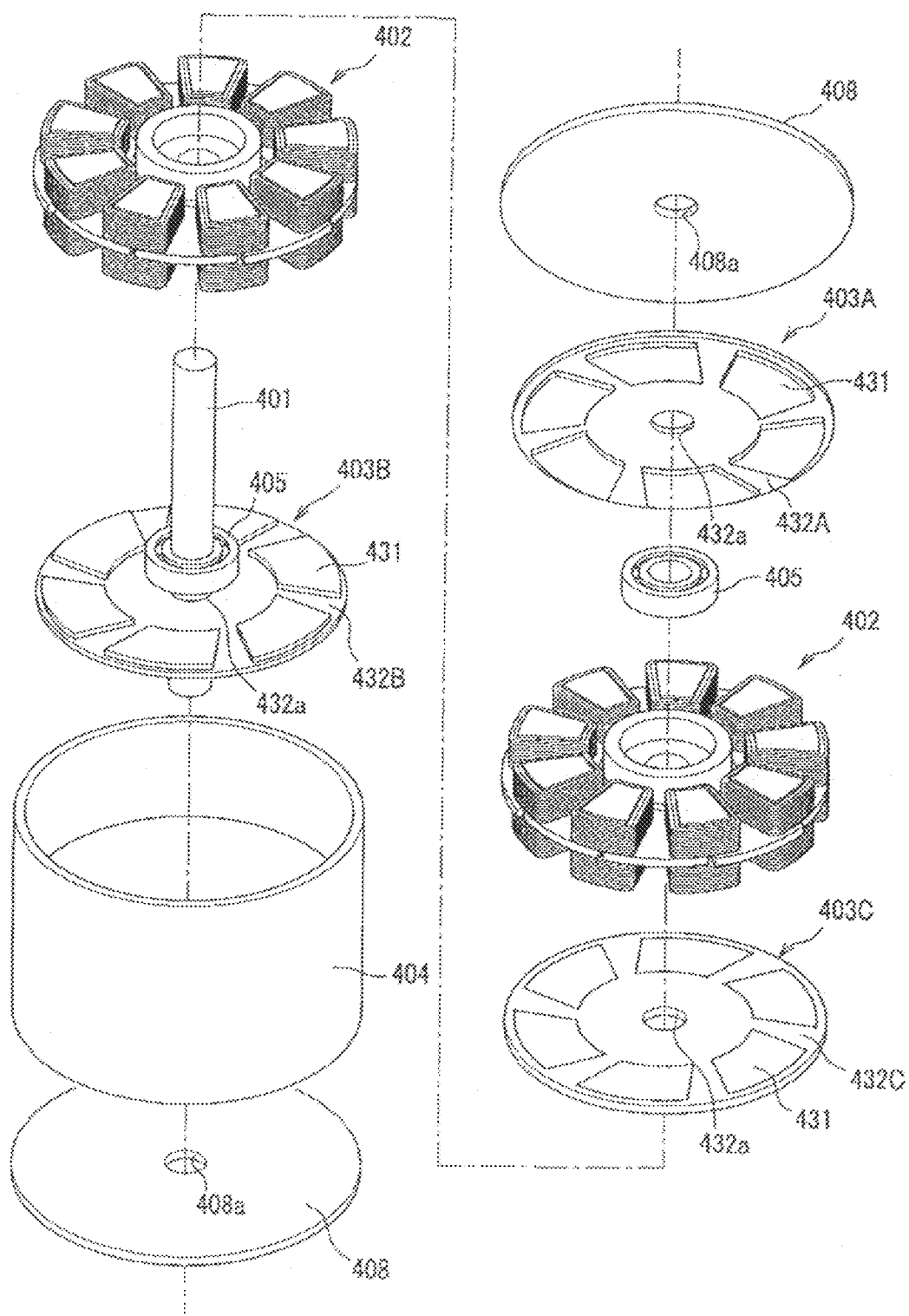
FIG. 22 is an exploded perspective view where component elements of the electrical rotating machine related to the fifth embodiment, are spread out along the rotor axis direction.

FIG. 21 is a partial cross-sectional perspective view of the electrical rotating machine in accordance with the fifth embodiment, and FIG. 22 is an exploded perspective view where component elements of the electrical rotating machine in accordance with the fifth embodiment are spread out along the direction of the rotor shaft.

As shown in FIG. 21, for this axial gap electrical rotating machine 505 (hereinafter, referred to merely as electrical rotating machine 505), stators 402 in the above-described third or fourth embodiment are housed in a housing 404 along the axial line direction AX of a rotor shaft 41 in two layers. A rotor 408A in the above-described embodiment 3 is arranged on the upper side of the stator 402 at the upper step in FIG. 21; a rotor 403C being an intermediate rotor is arranged between two layers of the stators 402. A rotor 403B in the above-described third embodiment is arranged on the lower side of the stator 402 at the lower step in FIG. 21. The outer faces (the upper and lower faces in FIG. 21) on the both sides in the axial line direction AX of the rotor shaft 401, are covered by disc shaped covers 408 having a rotor shaft hole 408a at the central portion thereof (refer to FIG. 22).

Incidentally, the electrical rotating machine 505 is a three-phase permanent magnet synchronization motor.

Incidentally, in the third and fourth embodiments, ball bearings 405, 405 are fitted in the respective bearing holding holes 425a, 425a (refer to FIGS. 12 and 14) of the bearing holding member 425 of the stator 402, on the both sides with respect to the axial direction AX of the rotor shaft 401. However, the present embodiment is different from the third and fourth embodiments in that, in FIG. 21, a ball bearing 405 is fitted in the upper side bearing holding hole 425a of a bearing holding member 425 of the stator 402 at the upper step, while a ball bearing 405 is fitted in the lower side bearing holding hole 425a of a bearing holding member 425 of the stator 402 at the lower step.

The same reference symbols will be given to the same elements as those in the third or fourth embodiment, and overlapping description will be omitted.

<Intermediate Rotor>

Figure 23A:
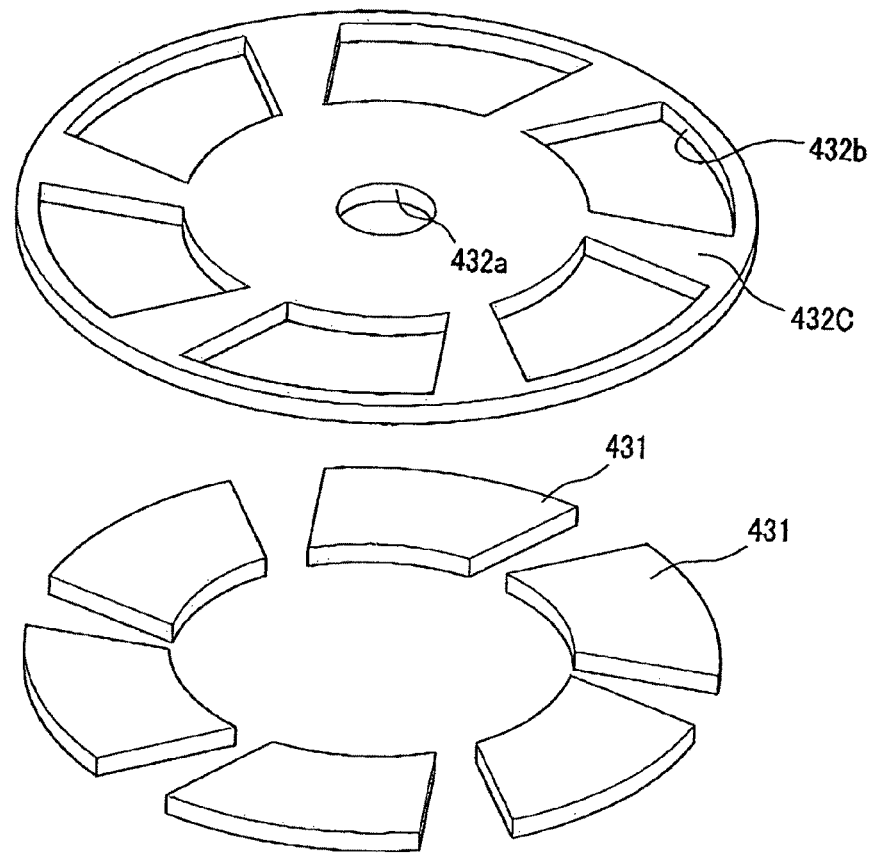
FIGS. 23A and 23B are illustrations of a method for holding magnets of an intermediate rotor of the electrical rotating machine in accordance with the fifth embodiment, wherein FIG. 23A are exploded perspective views
Figure 23B:
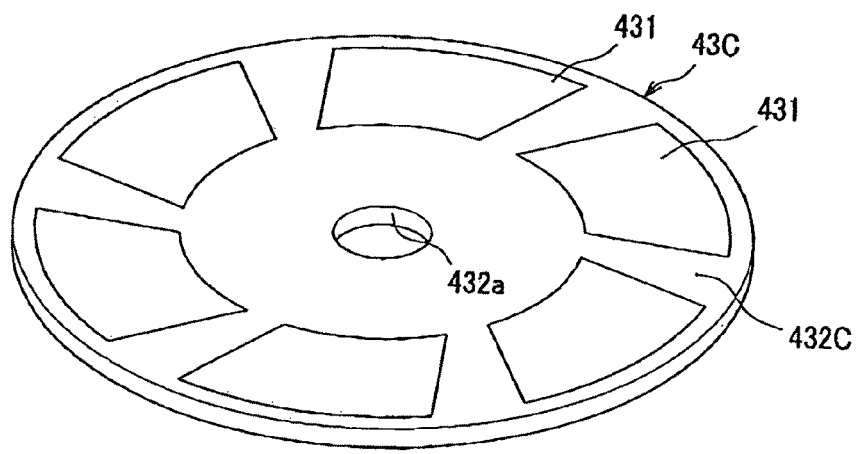

Next, referring to FIGS. 23A and 23B, the rotor 403C to be the intermediate rotor being a feature of the present embodiment will be described. FIGS. 23A and 23B are illustrations of a method of holding the magnets of the intermediate rotor of the electrical rotating machine in accordance with the fifth embodiment, wherein FIG. 23A is an exploded perspective view, and FIG. 23B is an assembly perspective view.

The rotors 403A, 403B have a structure where the rotor discs 432A, 432B thereof form respective back yokes for the permanent magnets 431, while the rotor 403C has a structure where the rotor disc (field magnetic pole holding member) 432C thereof does not form a back yoke for the permanent magnets 431. That is, the rotor disc 432C is preferably made of a non-magnetic body or non-conductive material, and has, for example, a structure substantially in a disc shape of an engineering plastic with a high strength. The rotor disc 432C has a rotor shaft hole 432a at the center thereof and holding holes (magnet holding holes) 432b for holding the permanent magnets 431 with the same periodicity as the disposition of the permanent magnets 431 of the rotors 403A, 403B and the same shape. The permanent magnets 431 are adhesively fixed to the holding holes 432b. Thus, the permanent magnets 431 of the rotor 403C are correctly disposed in the rotor disc 432C, as shown in FIG. 23B, which enables arrangement of a rotor capable of effectively using the faces, on the both sides in the axial line direction AX, of the rotor shaft 401.

Incidentally, in FIG. 22, a permanent magnet 431 of the rotor 403A, permanent magnets 431 of the rotor 403C, and a permanent magnet 431 of the rotor 403B, the permanent magnets being disposed at the same position with respect to the circumferential direction CIR, are arranged such that the magnetic polarities facing the stators 402 are in the order, for example, of N pole (rotor 403A), S pole (the upper face of the rotor 403C in FIG. 22), N pole (the lower face of the rotor 403C in FIG. 22), and S pole (rotor 403B) from the top, or in the order of S pole (rotor 403A), N pole (the upper face of the rotor 403C in FIG. 22), pole (the lower face of the rotor 403C in FIG. 22), and N pole (rotor 403B) from the top.

The electrical rotating machine 505 in the present embodiment has four gap planes contributable to the torque output, realizing an electrical rotating machine 505 with a high output. An axial gap electrical rotating machine has a feature of having a flat shape with respect to the axial line direction AX of the rotor shaft 401, and accordingly the diameter was necessary to be large so as to obtain a large output of the axial gap electrical rotating machine. However, in accordance with the present embodiment, an electrical rotating machine with a high output can be obtained by superposing stators and an intermediate rotor along the axial line direction AX of the rotor shaft 401.

Further, regarding the method of fixing the stators 402 to the housing 404, by varying the inner diameter of the housing 404 with steps, the positioning accuracy along the axial line direction AX of the rotor shaft 401 of the stators 402 at the time of fixing the stators 402 inside the housing 404 can be improved.

<First Modified Example of Magnet Fixing Method for Intermediate Rotor>

Next, referring to FIG. 24, a structure of a rotor 403D to be a first modified example, of the rotor 403C, for holding permanent magnets 431B with a similar structure to the above will be described.

Figure 24A:
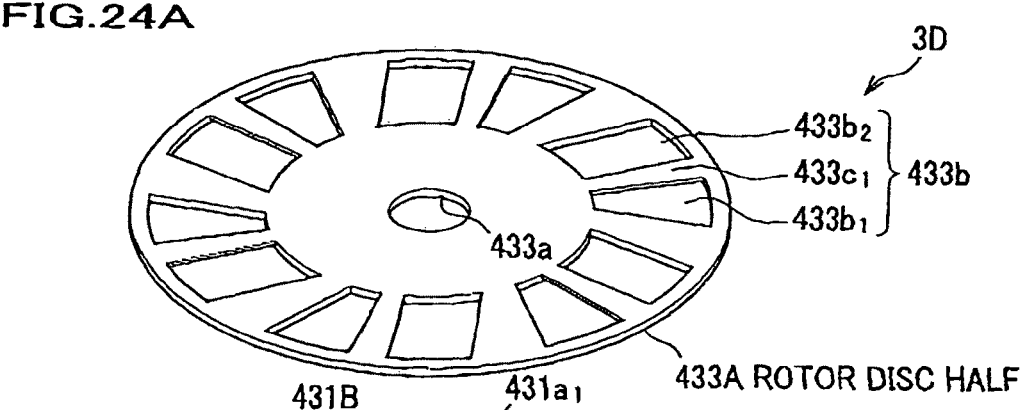
Figure 24A:
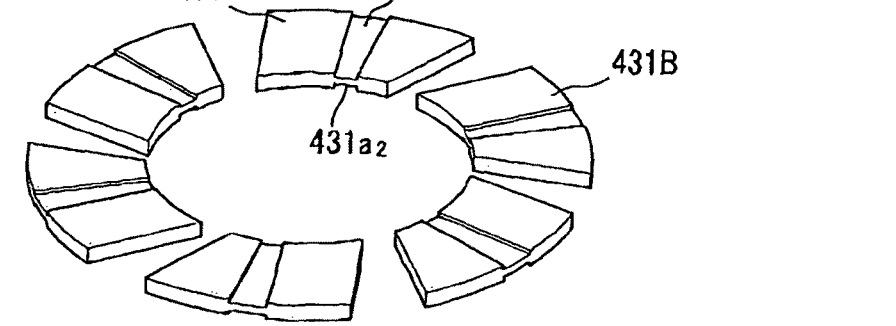
Figure 24A:
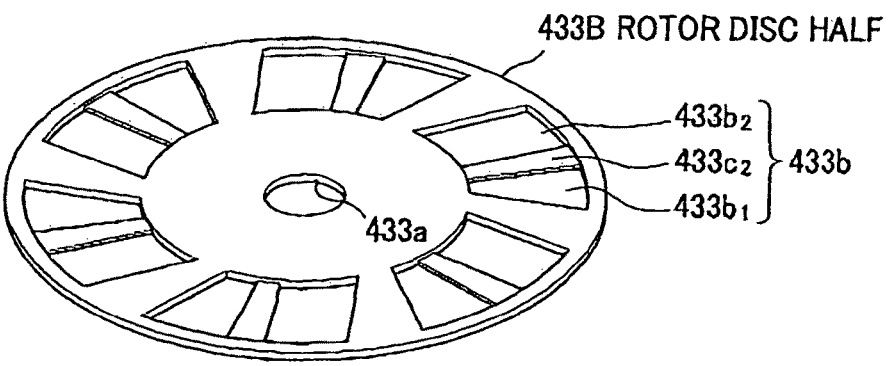
Figure 24B:
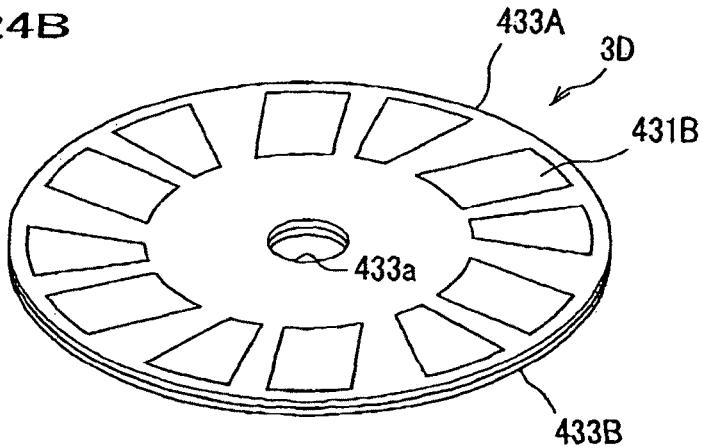

FIGS. 24A and 24B are illustrations of the first modified example of the magnet holding method for the intermediate rotor of the electrical rotating machine in accordance with the fifth embodiment, wherein FIG. 24A is an exploded perspective view, and FIG. 24B is an assembly perspective view.

The rotor 403C includes a pair of rotor disc halves (field magnetic pole holding members) 433A, 433B having a rotor shaft hole 433a at the central portion thereof, and permanent magnets 431B held by being sandwiched therebetween. As shown in FIG. 24A, the permanent magnets 431B have recessions $431a_1$, $431a_2$ substantially along the radial direction on the both faces. The rotor disc halves 433A, 433B have holding holes (magnet holding holes) 433b for holding the permanent magnets 431B as well as the rotor 403C has the holding holes 432b (refer to FIG. 23A), however, the rotor disc halves 433A, 433B are provided with bridge portions $433c_1$, $433c_2$ for inhibiting moving of the permanent magnets 431B along the axial line direction AX of the rotor shaft 401. The bridge portions $433c_1$, $433c_2$ are disposed at positions in the holding holes 432b, the positions corresponding to the above-described recessions $431a_1$, $431a_2$ of the permanent magnets 431, and on respective one sides of the rotor disc halves 433A, 433B, the one sides facing the respective stators 402 (refer to FIG. 22). The bridge portions $433c_1$, $433c_2$ are arranged to have a smaller thickness than that of the rotor disc halves 433A, 433B with respect to the axial direction AX of the rotor shaft 401 so that the thickness of the portion of the permanent magnets 431B along the axial line direction AX of the rotor shaft 401, the portion corresponding to the position of the bridge portions $433c_1$, $433c_2$, is not significantly decreased. Incidentally, the two rotor disc halves 433A, 433B are arranged such that the thickness of the rotor 403D is not larger than that of the permanent magnets 431B.

The permanent magnets 431B are disposed between the rotor disc halves 433A, 433B, and the rotor disc halves 433A, 433B and the permanent magnets 431B are assembled with an adhesive agent, as shown in FIG. 24B.

The permanent magnets 4318 have the Magnetic pole surfaces exposed through the windows $433b_1$, $433b_2$ (refer to FIG. 24A) of the holding holes 432b to the stator 402 sides (refer to FIG. 22).

Incidentally, in FIG. 24A, the recessions $431a_1$, $431a_2$ and the bridge portions $433c_1$, $433c_2$ are arranged substantially along the radial direction and at the same circumferential positions, however, the invention is not limited thereto. In order to increase the strength of the recessions $431a_1$, $431a_2$ of the permanent magnets 431B, the bridge portions $433c_1$, $433c_2$ may be arranged, for example, in an X shape, and the recessions $431a_1$, $431a_2$ may be arranged corresponding thereto.

By fixing the permanent magnets 431B to the rotor 403D as in present modified example, the increase in the bonding area compared with the bonded surfaces between the permanent magnets 431 of the rotor 403C and the edge portions of the holding holes 432b, and the holding by the bridge portions $433c_1$, $433c_2$ strengthen the function to hold the permanent magnets 431B of the rotor 403D against the absorbing force and repulsive force by the permanent magnets 4318 along the axial line direction AX of the rotor shaft 401, and thereby the possibility of separating off of the permanent magnets 431B is lowered. Further, an intermediate rotor being thin with respect to the axial direction AX of the rotor shaft 401 can be arranged.

<Second Modified Example of Method for Fixing Magnets of Intermediate Rotor>

Next, referring to FIGS. 25A and 25B, a structure of a rotor 403E being a second modified example of the rotor 403C will be described, wherein the rotor 403E holds the permanent magnets 431C with a structure similar to the above.

Figure 25A:
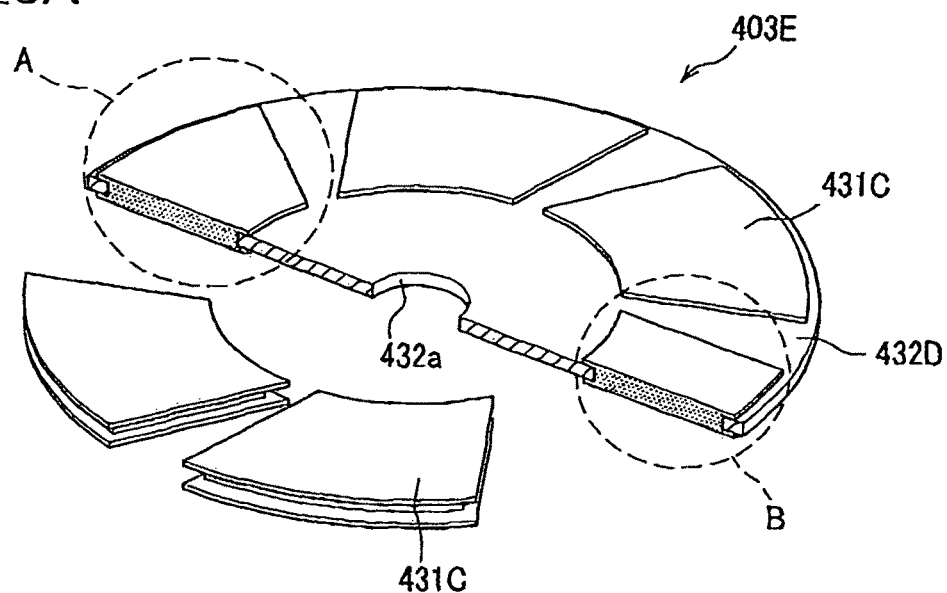
Figure 25B:
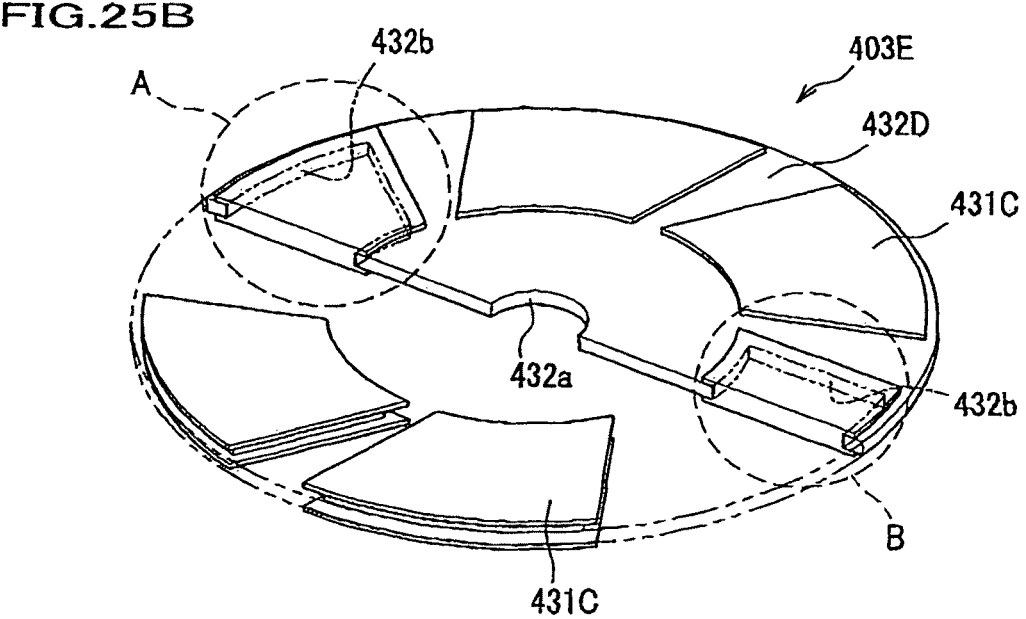

FIGS. 25A and 25B are illustrations of a second modified example of a method of holding the magnets of the intermediate rotor of the electrical rotating machine in accordance with the fifth embodiment, wherein FIG. 25A is a partial cross-sectional perspective view of the intermediate rotor and a perspective view of the permanent magnets thereof, and FIG. 25B is an illustration of a position relationship between the portions A and B of the rotor disc, and the permanent magnets at the time of fixing. A rotor disc (field magnetic pole holding member) 432D of the rotor 403E of the present modified example is made of a single plate substantially in a disc shape having a rotor shaft hole 432a at the central portion thereof, and is provided with holding holes (magnet holding holes) 432b for holding the permanent magnets 431C with the same periodicity as the disposition of the permanent magnets 431 of the rotors 403A, 403B and with the same shape.

The permanent magnets 431C fitted inside the holding holes 432b are resin molded magnets formed by insert-forming by the use of injection molding or the like into the holding holes 432b provided through the rotor disc 432D formed in advance. By such a forming method, the permanent magnets 431C are, as shown in FIG. 25B which shows the portion A and portion B in FIG. 25A, formed such that the both side portions of the permanent magnets 431C, the both sides being with respect to the axial line direction AX of the rotor shaft 401 and the both side portions being at the edge portions of the planar shape of the permanent magnets 431C, sandwich the edge portions of the holding holes 432b, and the permanent magnets 431C are thus fixed to the rotor disc 432D. The both faces, with respect to the axial direction of the rotor shaft 401, of the permanent magnets 431C are exposed, and the rotor disc 432D is arranged to have a thickness smaller than that of the permanent magnets 431C.

Incidentally, as resin molded magnets, those formed by the use of a resin composite material of ferrite and thermoplastic resin for ferrite bonded magnets are well known.

The fixing of the permanent magnets 431C to the rotor 403E as the present example strengthens, compared with the bonded surfaces between the permanent magnets 431 of the rotor 403C and the edge portions of the holding holes 432b, the function to hold the permanent magnets 431C of the rotor 403E against the absorbing force and repulsive force by the permanent magnets 431C along the axial line direction AX of the rotor shaft 401 is improved, and thereby the possibility of separating off of the permanent magnets 431C is lowered. Further, an intermediate rotor being thinner with respect to the axial direction AX of the rotor shaft 401 can be arranged.

INDUSTRIAL APPLICABILITY

Amorphous cores in accordance with the invention can be applied to brushless motors aimed at downsizing, high efficiency, and low noise. Further, a motor having an axial gap structure by the use of amorphous cores in accordance with the invention can be applied to general motor systems, such as fan systems, with a thin shape and high efficiency.

The invention claimed is:

1. An armature core for an electrical rotating machine, comprising:
   a plurality of core portions isolated from each other, wherein each of the plurality of core portions is formed by cutting a ring form member including a plurality of non-crystalline metallic foil bands wound and laminated in a diametrical direction to divide the ring form member in a circumferential direction; and
   resin for bond-fixing the non-crystalline metallic foil bands,
   wherein each of the plurality of core portions includes two cut surfaces formed across lamination layers of the non-crystalline metallic foil bands
   wherein the armature core further comprising: a core holding member in a disc form having a plurality of holes or recessions, wherein the armature core is inserted in the holes or recessions of the core holding member.

2. The armature core of claim 1, wherein amorphous metal is used as an iron base of the non-crystalline metallic foil bands.

3. The armature core of claim 1, wherein the cut surfaces are perpendicular to surfaces of the laminated non-crystalline metallic foil bands.

4. The armature core of claim 1, wherein, when the armature core is to be used in a motor, a portion of the resin on a gap side of the armature core has a thickness of 0.3 mm-0.5 mm.

5. The armature core of claim 4, wherein the plurality of non-crystalline metallic foil bands are laminated and are connected between layers of the non-crystalline metallic foil bands.

6. The armature core of claim 4, comprising:
   a core portion including a lamination of a plurality of non-crystalline metallic foil bands; and
   a resin layer on an outermost side of the lamination layers.

7. The armature core as claimed in claim 1, further comprising a resin layer on four surfaces except the two cut surfaces.

8. The armature core as claimed in claim 1, further comprising a resin layer on an end face of the ring form member, the resin layer including a recession at a cut place for dividing the ring form member in the circumferential direction, wherein the ring form member is cut at the recession.

9. The armature core as claimed in claim 1, wherein an edge portion on an outer circumferential face along a direction of winding a coil wire, has a roundness R.

10. An axial gap motor comprising:
a stator including a plurality of armature cores as claimed in claim 1 disposed in the circumferential direction, each armature core including a winding wound around the armature core; and
a rotor disposed in the axial direction from the stator.

11. The axial gap motor as claimed in claim 10, wherein the rotor is installed on both sides of the stator.

12. The armature core as claimed in claim 1, wherein each of the core portions further includes two surfaces formed across lamination layers which are continuous with the cut surfaces.

* * * * *